United States Patent [19]

Noda et al.

[11] 4,209,847
[45] Jun. 24, 1980

[54] COMPUTERIZED NUMERICAL CONTROLLER FOR A MACHINE APPARATUS

[75] Inventors: Shigeo Noda, Nagoya; Hideo Honma, Kariya; Sadamu Kato, Takahama, all of Japan

[73] Assignee: Toyoda Koki Kabushiki Kaisha, Aichi, Japan

[21] Appl. No.: 909,647

[22] Filed: May 25, 1978

[30] Foreign Application Priority Data

Dec. 22, 1977 [JP] Japan .................. 52-154708

[51] Int. Cl.$^2$ ..................... G06F 15/46; G06F 9/16
[52] U.S. Cl. ...................... 364/900; 364/474; 364/120; 364/107; 364/300
[58] Field of Search ............. 364/474, 120, 107, 300, 364/200 MS File, 900 MS File

[56] References Cited

U.S. PATENT DOCUMENTS

| | | | |
|---|---|---|---|
| 3,668,853 | 6/1972 | Fair et al. | 364/200 |
| 4,038,533 | 7/1977 | Dummermuth et al. | 364/474 |
| 4,096,770 | 6/1978 | Tanner | 364/474 X |

OTHER PUBLICATIONS

Mesniaeff, P. G., "Technical Ins and Outs of Computerized Numerical Control", *Control Engineering*, Mar. 1971, pp. 65–84.

*Primary Examiner*—Raulfe B. Zache
*Attorney, Agent, or Firm*—McClelland & Maier Oblon, Fisher, Spivak

[57] ABSTRACT

A computerized numerical controller wherein a tape reader, upon reading of input tapes, inputs machine control data including source language instruction data into a storage device of a data processing device. The processing device, when operated under the control of an automatic programming program, converts the source language instruction data into blocks of machine part instruction data and stores the same in the storage device. The processing device, when operated under the control of a numerical control program, produces command signals each indicative of the length and velocity that a machine apparatus connected thereto is to move, in accordance with each of the blocks of the machine part instruction data and outputs the command signals to the machine apparatus so as to control the same. The processing device is enabled to operate selectively under the above-mentioned two programs.

8 Claims, 34 Drawing Figures

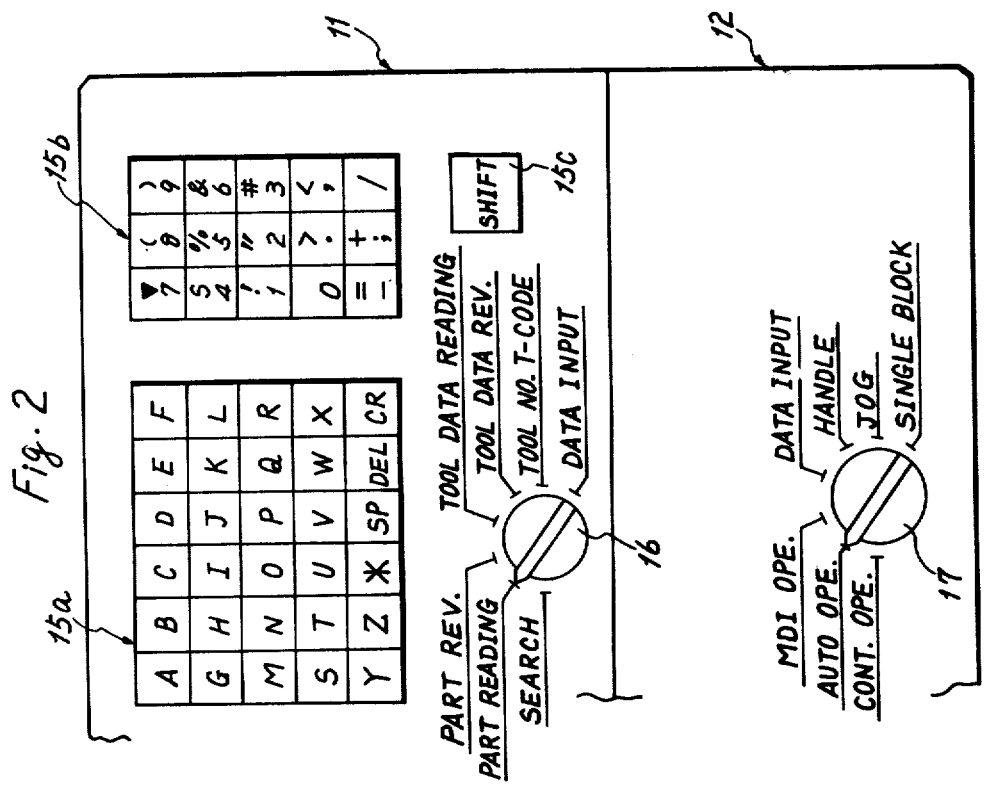
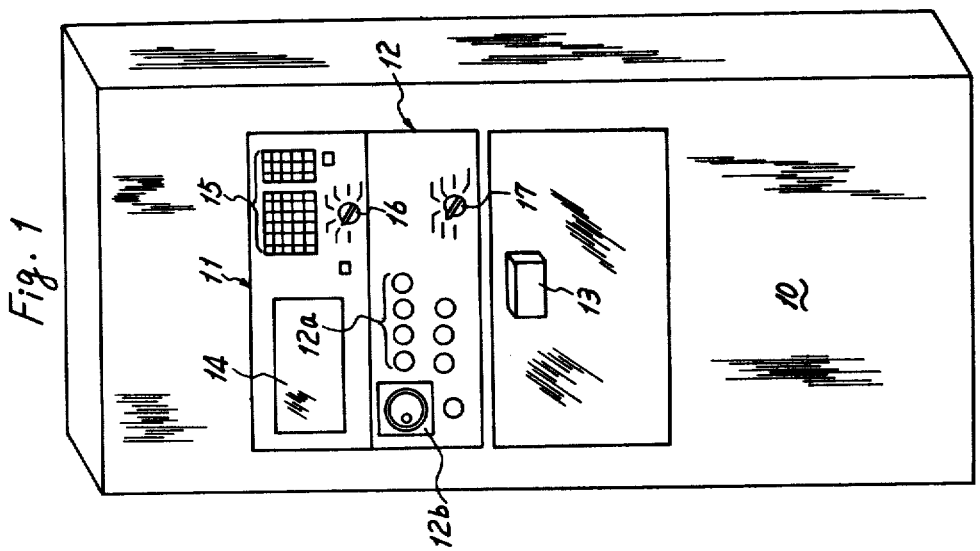

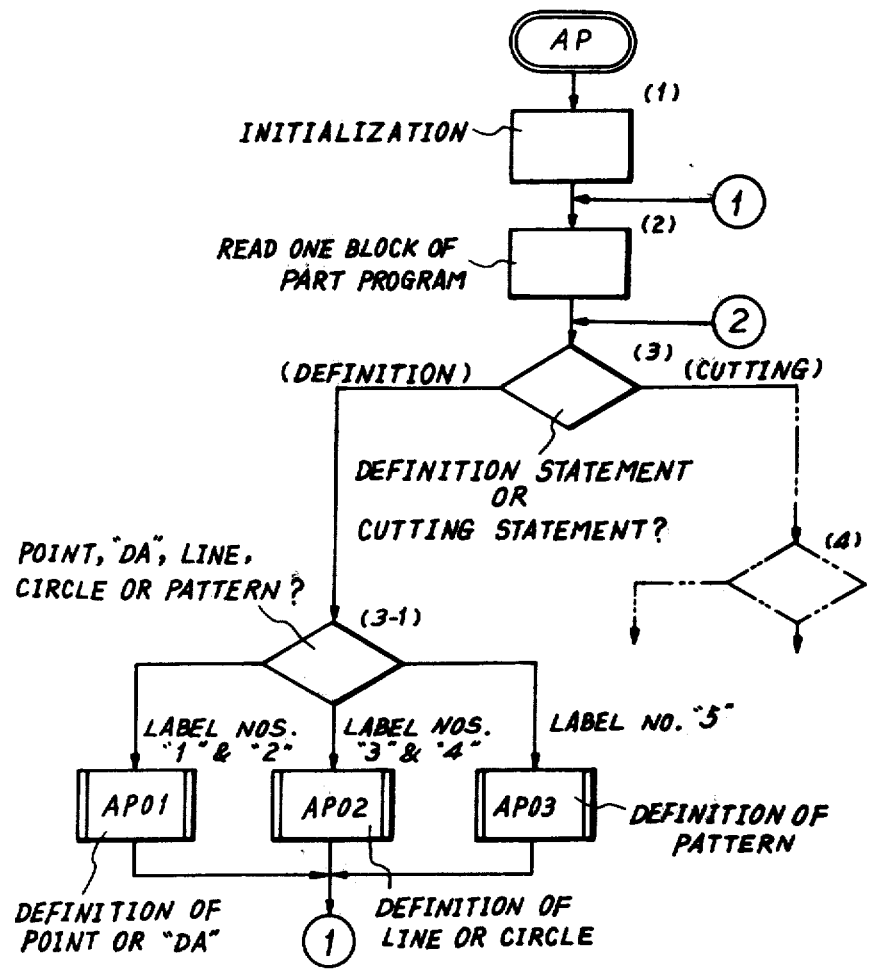

Fig. 14

BORING CYCLE TABLE

| BOR | (TOOL #) | |
|---|---|---|
| RAPID 1000 | Xa, Ya, Za | RAPID FEED ADVANCED END |
| FEED | ( F ) | FEED RATE |
| SPEED | ( S ) | ROTATIONAL SPEED |
| 1000 | Xb, Yb, Zb | CUTTING FEED ADVANCED END |
| RAPID 1000 | Xc, Yc, Zc | RAPID FEED RETRACTED END |

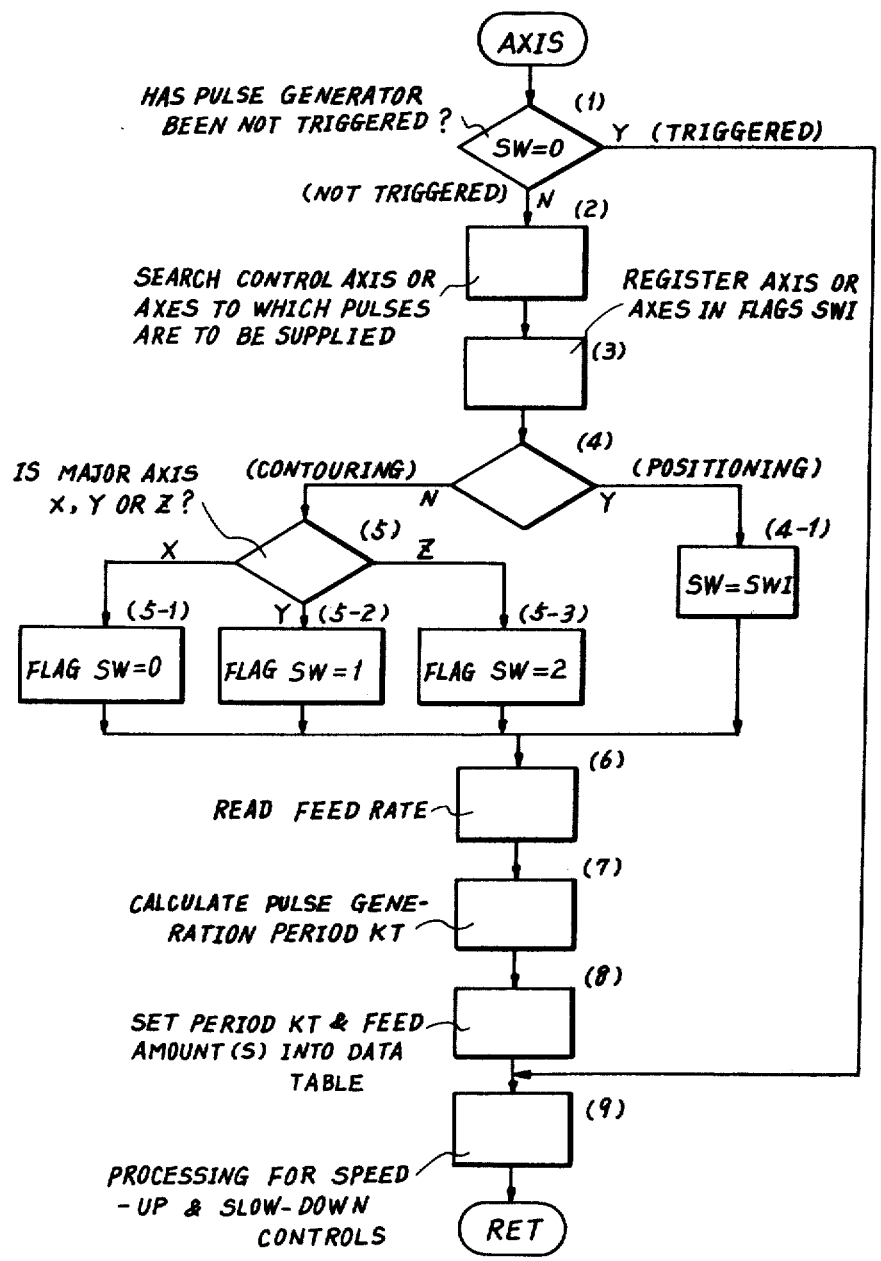

Fig. 31

EXEMPLIFIED PART PROGRAM

```
DA1=(200,0,-450)              DEFINITION OF WORKPIECE SETTING POSITION
P1=(150, 130)                 DEFINITION OF COORDINATE VALUES OF POINT P1

BOR, 610/DP35, SDP0/DA1, P1          90mm BORING
PAT1=DA1, NH6, P1, R65, SA30, IA60   PATTERN OF 8φ TAPPING HOLES
DRL, 106/DP20/PAT1                   6.2φ DRILLING FOR FEMALE SCREW (SIX)
TAP, 208/DP16/PAT1                   8φ TAPPING (SIX)

P2=(25, 20, -5)                      DEFINITION OF POINT P2
DRL, 105/DP15/DA1, P2, (P2(0,30)=P3),
     (P3(0,170,-5)=P4)               4.2φ DRILLING FOR FEMALE SCREW (THREE)
TAP, 206/DP12/DA1, P2, P3, P4        6φ TAPPING (THREE)
FINI
```

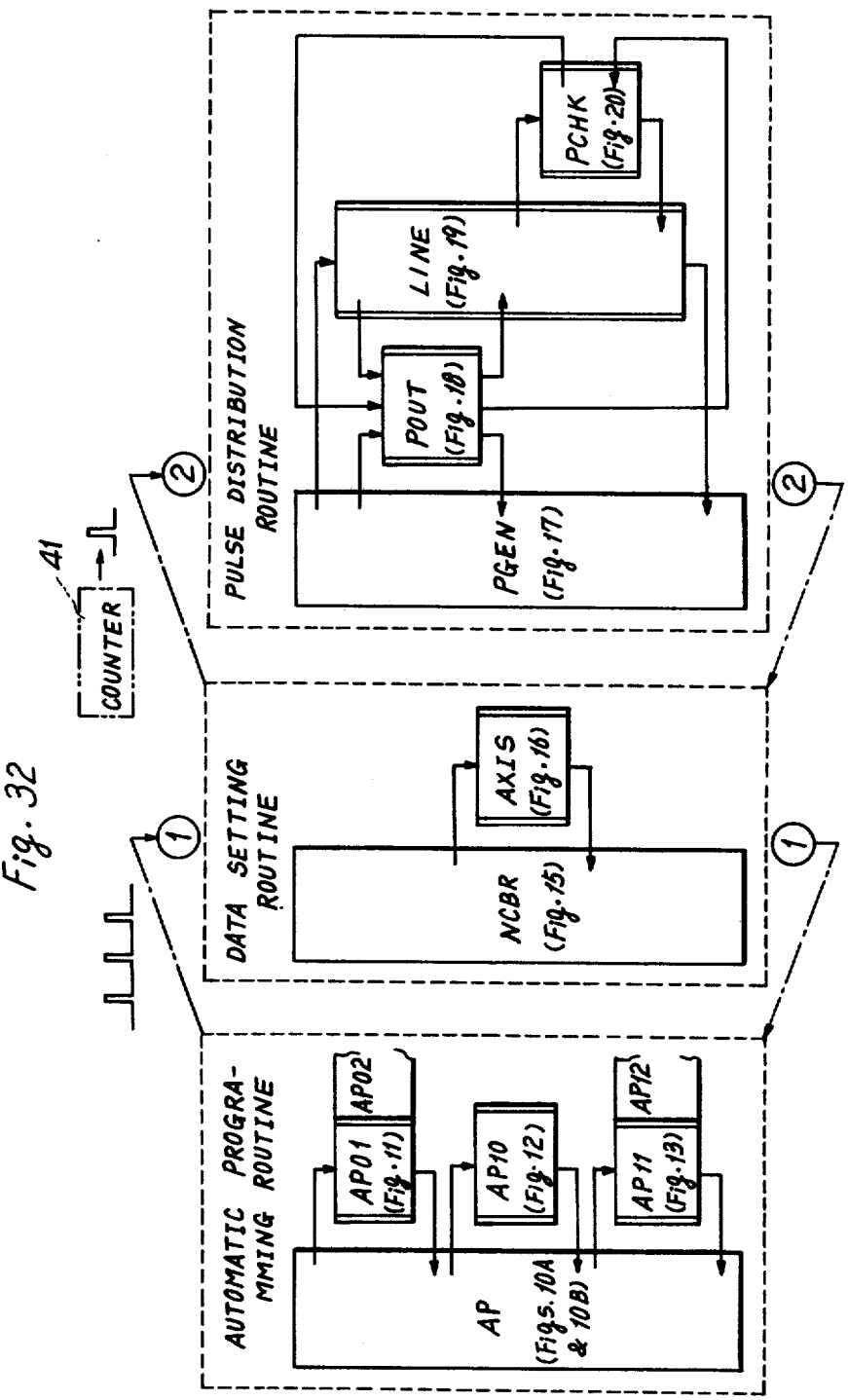

COMPUTERIZED NUMERICAL CONTROLLER FOR A MACHINE APPARATUS

BACKGROUND OF THE INVENTION

1. Field of the Invention

The present invention relates generally to a numerical controller for a machine apparatus and more particularly, to a computerized numerical controller with a digital computer achieving an automatic programming function in addition to a numerical control function.

2. Description of the Prior Art

It is well known that conventional numerical controllers, each used for a single machine tool, require numerical control (NC) tapes as a means of data input. Such NC tapes are prepared in general either by an operator who calculates coordinate values of points by reference to a part drawing, makes a process sheet and manipulates a tape puncher in accordance with information on the process sheet, or by a computer which reads an input tape memorizing a part program written in an automatic programming language. For preparation of NC tapes, there have heretofore been used the above-noted two methods: manual programming methods by an operator, and automatic programming method by a computer. However, the manual programming method usually takes about ten times as much time as is taken for machining one workpiece under numerical control and therefore, the merit of machining under numerical control is little realized unless the number of the workpieces of the same kind which are machined as one lot is more than five (5). This is also based upon the fact that machining by a general purpose machine tool, not numerically controlled, usually takes about three times as much time as machining under numerical control takes. That is, the number of workpieces in the case where machining under numerical control is more advantageous in terms of decreasing machining time than machining by general purpose machine tools is decided by an expression $10T + nT \leq 3nT$ (provided that T is the time necessary for numerical control machining), so that $n \geq 5$ is necessitated to realize the merits of machining under numerical control.

On the other hand, the automatic programming method has the advantage of decreasing NC tape preparation time, but requires the use of a large capacity computer facility. Therefore, users not having such a computer facility are not able to utilize the automatic programming method and may be urged to make an enormous investment for such a computer facility. Further, although the utilization of the automatic programming method makes the preparation by a computer of NC tapes possible, the setting-up of the NC tapes on a numerical controller is left without being omitted, still failing to relieve an operator of handling the NC tapes.

SUMMARY OF THE INVENTION

Accordingly, it is a primary object of the present invention to realize a complete elimination of any NC tape, an easy programming of machining and a considerable time decrease in programming. To achieve this object, a computerized numerical controller according to the present invention is provided with one computer such as, preferably, a so-called "general purpose minicomputer", which executes a numerical control function and an automatic programming function. Particularly, the controller is characterized in that the difficult determination of machining condition is automatized to enable an operator to make out any machining program without the aid of a skilled programmer. In the controller, tool data is stored in a memory device independently of a part program, and when the automatic programming function is executed, a machining condition is determined based upon tool data for a tool designated by a readout unit block of a part program. Numerical control data is made based upon the machining conditions and is utilized to execute the numerical control function. The numerical control function is executed on a real time basis with respect to the automatic programming function, so that the controller takes a simple form of construction which, except for a mini-computer, needs neither a large memory capacity nor a special auxiliary memory device, thus avoiding a sharp increase of cost.

Another object of the present invention is to decrease a necessary capacity of a memory device used therein. To achieve this object, only tool data for tools stored in a tool magazine of a machine apparatus connected to the controller are selected and stored in the memory device. This advantageously results in decreasing the necessary capacity of the memory device to several tenths of that needed in the case of storing therein tool data for all tools which are anticipated to be used in the machine apparatus. Additionally, in order to decrease steps of tool data storing, a corresponding relation is established between T-codes assigned to respective memory storage locations and tool numbers, so that necessary tool data is selected and stored in the memory device by causing a tape reader to read a tool data tape.

A further object of the present invention is to make it possible to easily revise and edit any part program being stored. This object is attained by causing the part program and tool data to be stored in a memory device. While an NC tape used to be prepared even in case of revising only a part of a machining program, such is no longer necessary. In addition, an arrangement is provided to perform the revision of any tool size included in the tool data if need be, so that it is possible to compensate for the tool size without revising a part program concerned.

Briefly, according to the present invention, there is provided a computerized numerical controller for controlling a single machine apparatus, which controller comprises a data reading device for reading data relating to control of the machine apparatus, the data including source language instruction data prescribing movements of said machine apparatus; and a data processing device connected to the data reading device and connectable to the machine apparatus. The data processing device incorporates therein a storage device for storing the source language instruction data supplied from the data reading device and, when operated under the control of an automatic programming program, serves as a language translator device for converting the source language instruction data into blocks of machine part instruction data. The storage device also stores a predetermined number of the blocks of the machine part instruction data. The data processing device, when operated under the control of a numerical control program, serves as a numerical control device for producing command signals each indicative of the length and velocity that the machine apparatus is to move, in accordance with each of the blocks of the machine part instruction data and for outputting the command signals to the machine apparatus so as to thereby control movement of the machine apparatus. Further, the data processing device is operable to selectively serve as the language translator device and the numerical control device, so that the data processing device is able to generate the blocks of machine part instruction data based upon the source language instruction data as it controls the machine apparatus in accordance with one of the blocks of the machine part instruction data.

BRIEF DESCRIPTION OF THE DRAWINGS

Various other objects, features and attendant advantages of the present invention will readily be appreciated as the same becomes better understood by reference to the following detailed description of a preferred embodiment thereof when considered in connection with the accompanying drawings, wherein like reference numerals designate like or corresponding parts throughout the several views and in which:

FIG. 1 is an exterior view of a numerical controller according to the present invention;

FIG. 2 is a partial enlarged view of an NC control board and a relay logic control board;

FIGS. 10A and 10B are flow charts illustrating a main routine of automatic programming;

FIG. 14 shows one example of the cycle tables;

FIG. 16 is a flow chart illustrating a subroutine of numerical control executed for setting of pulse generation periods;

FIG. 31 shows a part program for machining of the workpiece illustrated in FIG. 30;

FIG. 32 is a flow chart illustrative of whole rough flow of processing executed by the controller.

DETAILED DESCRIPTION OF A PREFERRED EMBODIMENT

Figure 3:
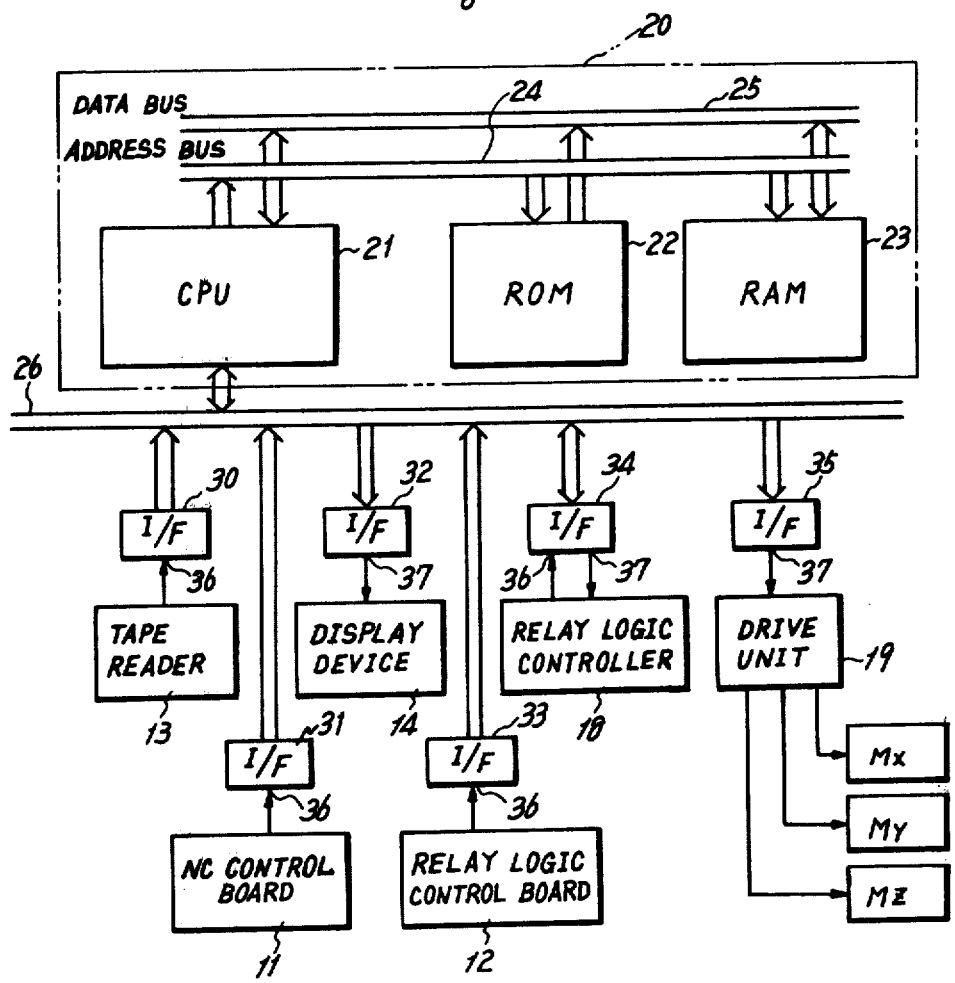
FIG. 3 is a block diagram illustrative of the system construction of the controller.

Referring now to FIG. 1, there is shown an exterior view of a numerical controller incorporating therein a general purpose digital minicomputer, such as, for example, a NOVA 3 series computer, manufactured by Nippon Mini-Computer Corporation, Tokyo, Japan, which performs an automatic programming function and a numerical control function for translating part programs written in an automatic programming language so as thereby to numerically control a machine tool connected thereto. A box frame 10 housing the numerical controller includes a front console panel, which is provided thereon with an NC control board 11, a relay logic control board 12 and a tape reader 13. The NC control board 11 is provided thereon with a display device 14, data input keys 15, and a data processing mode selector 16. The relay logic control board 12 is provided thereon with various push button switches 12a such as a start button, a stop button and the like necessary for machine operation control, a manually operated pulse generator 12b and an operation mode selector 17. This selector 17 is switchable to any one of operation modes such as CONTINUOUS OPERATION, AUTOMATIC OPERATION, MDI (MANUAL DATA INPUT) OPERATION, DATA INPUT, HANDLE, JOG and SINGLE BLOCK and, when switched to the MDI OPERATION mode, makes effective data manually input from the NC control board 11. The data processing mode selector 16 on the NC control board 11 is provided for designating data processing modes and is switchable to any one of (1) a SEARCH mode, (2) a PART PROGRAM READING mode, (3) a PART PROGRAM REVISION mode, (4) a TOOL DATA READING mode, (5) a TOOL DATA REVISION mode, (6) a TOOL NUMBER-T-CODE SETTING mode and (7) a MANUAL DATA INPUT mode.

The display device 14 successively displays necessary data, enabling an operator to input various data in a manner of conversation with the computer as well as to confirm the input data. During machine operation, the display device 14 displays a single source instruction of a part program by which the machine tool is being presently controlled, together with a number of blocks of machine part instructions which have been generated from the single source instruction by translating the same in accordance with the automatic programming function. Accordingly, it is preferable to use, as the display device 14, a plasma display which is capable of simultaneously displaying alphabetic letters or characters Arabic numerals and other characters through a plurality of data lines.

The data input keys 15 are separated chiefly into alphabetic keys 15a and numeral keys 15b, which, when depressed in combination, input data and/or commands to the computer. The numeral keys 15b are accompanied by different characters in addition to the Arabic numerals and, when depressed concurrently with a shift key 15c, input to the computer the different characters in lieu of the Arabic numerals, respectively.

FIG. 3 is a block diagram illustrative of the system construction of the numerical controller housed in the box frame 10. The computer 20 is composed of a central processing unit 21, a read-only memory 22 and a random access memory 23. The central processing unit 21 outputs address data to an address bus 24 so as to designate an address of the memories 22 and 23, so that through the address bus 24, the processing unit 21 is able to read out data from each of the memories 22 and 23, and writes data in the random access memory 23. The central processing unit 21 is connected to an I/O bus 26, also to which the tape reader 13, the data input key 15 and the data processing mode selector 16 of the NC control board 11, the display device 14, the various switches 12a and the manually operated pulse generator 12b of the relay logic control board 12, a relay logic controller 18, and a servomotor drive unit 19 are connected respectively through related interfaces 30 to 35. The relay logic controller 18 may be independent of the numerical controller according to the present invention. While the detail of the relay logic controller 18 is omitted since the same is not a part of this invention, it is understood that the relay logic controller 18 may consist of magnetic relays, solenoids, limit switches and the like for controlling a tool exchange operation and other auxiliary function operations of the machine tool, or may be a well-known programmable sequence controller arranged to control such operations in accordance with a stored program. The I/O bus 26 is a bidirectional bus line, which constitutes data lines of all of the peripheral devices to the computer 20. Each of the interfaces 30–35 provides an input channel 36, an output channel 37, or the both to and from the computer 20. In the read-only memory 22, there are stored a control program for executing the automatic programming function under which a part program is translated to be converted into a plurality of blocks of machine part instructions, another control program for executing the numerical control function in accordance with each block of the machine part instructions, another control program for executing a program editing function under which a part program is revised, deleted and added, and other necessary control programs. The random access memory 23 stores therein tool data and one or more part programs, which are read in from the tape reader 13, as well as calculated values appearing in the course of data processing.

Figure 4:
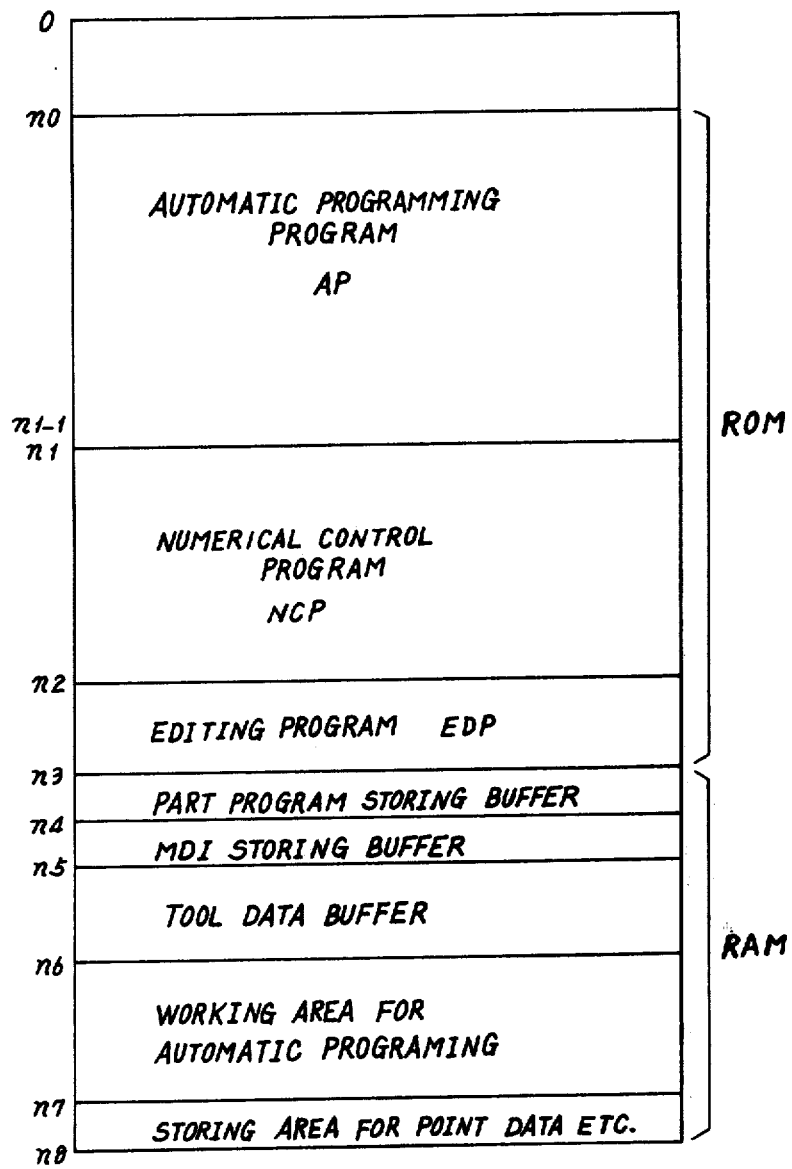
FIG. 4 is an explanatory representation of data locations in memory devices.

To the memory areas that the read-only memory 22 and the random access memory 23 provide, the various programs are assigned to have respective address ranges as shown in FIG. 4. Memory addresses n0 to n3-1 are of the read-only memory 22, wherein an automatic programming program AP is stored at address numbers n0 to n1-1, a numerical control program NCP at address numbers n1 to n2-1, and an editing program EDP at address numbers n2 to n3-1. Memory addresses n3 to n8 are of the random access memory 23, wherein one or more part programs are stored at address numbers n3 to n4-1. Another part program, manually input, is stored at address numbers n4 to n5-1. Tool data is stored at address numbers n5 to n6-1, whose memory capacity is determined depending upon the number of tools storable at a time in a tool magazine of the machine tool. Address numbers n6 to n7-1 are in service as a working area for automatic programming and numerical control. In this working area, intermediate values in the course of calculation are stored and a cutting cycle table, an NC table, a data table and the like, which will be referred to later, are also prepared. Further, address numbers n7 to n8 store thereat coordinate values or points, lines and circles which are defined in part programs. A point table, a DA table and a buffer area B1, which will be referred to later, are also prepared in this area. Although memory means in this particular embodiment is composed of the read-only memory 22 and the random access memory 23, it is to be noted that a core memory may entirely be employed instead thereof.

Figure 5:
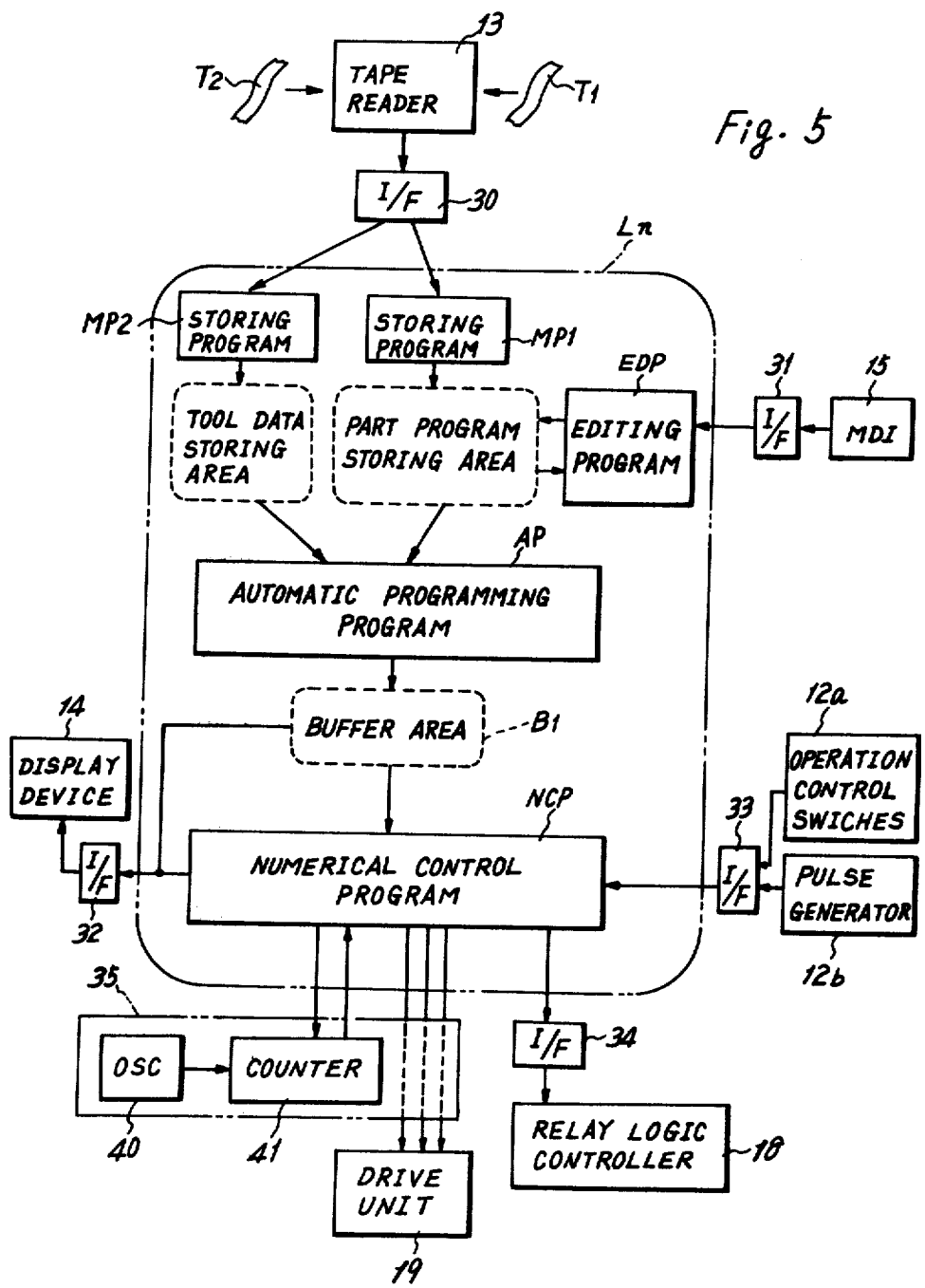
FIG. 5 is a flow chart graphically illustrating the general operations of system components of the controller.

FIG. 5 is a flow chart conceptually illustrating the internal processing function of the computer 20, which appears within a closed phantom line Ln. A tape T1 memorizing part programs is set up upon the tape reader 13. With the data processing mode selector 16 switched to the PART PROGRAM READING mode, a data storing program MP1 is executed, whereby the part programs are read out successively character by character so as to be stored in the memory area n3 to n4-1. After another tape T2 memorizing tool data is set up on the tape reader 13, the mode selector 16 is switched to the TOOL DATA READING mode. With the execution of another storing program MP2, only tool data of the tool numbers corresponding respectively to T-codes is selectively read to be stored in the tool data buffer or file. This reading of the tool data is unnecessary to be performed so far as no change is made with respective corresponding relations between the T-codes and the tool numbers. When the rearrangement of the respective corresponding relations between the T-codes and the tool numbers is required, the TOOL NUMBER-T-CODE SETTING mode is selected by means of the processing mode selector 16 and the data input keys 15 are depressed, so that the correspondence of a tool number to a T-code or of a T-code to a tool number can be changed. With the subsequent reading of the tool data tape T2 by the tape reader 13, data of the tool number which corresponds to the T-code is stored at a memory address for the same T-code in the tool data file. The format of this tool data file is so determined for each T-code as to be shown in FIG. 6, wherein tool number, tool kind, diameter, setting length, effective length, rotational speed, feed rate and standard depth are stored in correspondence to each T-code.

The processing mode selector 16 is switchable to the PART PROGRAM REVISION mode and the TOOL DATA REVISION mode. In the respective modes, the part programs and the tool data which are so stored in the respective memory areas can be arbitrarily revised by the use of the data input keys 15, as will be described later in detail.

Each part program is written in a known automatic programming language useable in an automatic programming system "TAPROS 1000", which was developed by the assignee of this application and has now been commercially available. The following TABLE 1 shows examples of the automatic programming language. Each part program primarily comprises definition statements and cutting statements, the latter of which includes cutting modifier words. Each definition statement is represented by any one of keywords associated with respective label numbers 1 to 9, each cutting statement by any one of keywords associated with respective label numbers 11 to 15, and each modifier words by any one of keywords associated with respective label numbers 111 to 120. The keywords have meanings as noted in right column of Table 1, respectively.

TABLE 1

| | LABEL NUMBER | KEYWORD | MEANING |
|---|---|---|---|
| | 1 | P | point |
| | 2 | DA | setting of coordinate values of a point, a line, a circle or the like |
| DEFINITION | 3 | L | line |
| STATEMENT | 4 | C | circle |
| | 5 | PAT | pattern |
| | 6 | CL | clearance |
| | 7 | GO | positioning (absolute) |
| | 8 | GD | positioning (incremental) |
| | 9 | MAC | definition of macro-statement (designating statements to be repeated) |
| | 11 | DRL | drilling cycle |
| CUTTING | 12 | TAP | tapping cycle |
| STATEMENT | 13 | REM | reaming cycle |
| | 14 | MIL | milling cycle |
| | 15 | BOR | boring cycle |
| | 111 | RGT | right |
| | 112 | LFT | left |
| | 113 | DP | effective depth |
| | 114 | DI | diameter in chamfering |
| CUTTING | 115 | FR | feed rate |
| MODIFIER | 116 | SS | rotatinal speed |
| WORD | 117 | SCL | clearance between positions respectively rapidly advanced and retracted |
| | 118 | SDP | rapid feed depth |
| | 119 | DW | dwelling time |
| | 120 | DH | step feed |

Each definition statement defines coordinate values of a point on a locus that the center of a cutting tool used draws. Each cutting statement designates the kind of machining such as, for example, drilling, milling or the like as well as the tool number of a tool used and further designates the motion locus defined by a definition statement.

In the automatic programming function, a part program is translated to machine part instructions of a format which enables the NC control program, referred to later, to distribute drive pulses to the servo systems of the machine tool. Each single source instruction, constituting the part program, usually generates a number of blocks of machine part instructions.

The translation of the part program includes such data processings as to calculate coordinate values of points, lines and circles defined by definition statements and to store the coordinate values of a number of points, prescribing tool motion locuses, in a point table of the memory area n7 to n8 and such data processings as to prepare instruction data for the motion locuses, prescribed by cutting statements, by reference to the point table. In the translation of the part program, data processings are further executed to determine machining conditions, such as feed amounts, feed rates of tools in an axial direction and spindle rotational speeds, by reference to the tool data file storing tool data. Through such data processings, the part program is converted into a plurality of blocks of machine part instructions. In order to always file the buffer area B1 which is capable of storing a plurality of the machine part instructions, the translation of the part program is executed in a selective manner with respect to the data processings for the numerical control function which will be described later in detail. This programming function is achieved by the provision of software.

The numerical control function includes data processings for executing pulse distribution based upon a direction instruction and a feed amount value in and through which a tool is to be moved and for successively outputing drive pulses to each servo drive axis at a commanded feed rate, whereby a feed direction control and a feed rate control of a tool can be performed. Except where conventional hard-wired circuit means is used for the purpose of generating a pulse train at a frequency corresponding to a commanded feed rate, the numerical control function, inclusively of the above-noted pulse distribution, is achieved by means of software. As shown in FIG. 5, the hard-wired circuit means is composed of a clock pulse generator 40 and a counter 41 which are provided in the interface 35 so as to serve as a demand pulse generator and into the latter of which is set a generation period computed based upon the commanded feed rate. In data processings for the numerical control function, the generation period is calculated based upon feed rate data, which is commanded by one block of machine part instructions being stored in the buffer area, and is set into the counter 41. Also in the processings, calculation is executed for deciding whether to output one drive pulse to each control axis X, Y, Z or not in response to an interruption command that the counter 41 generates upon its counting-up. This one pair of the clock pulse generator 40 and the counter 41 are sufficient for use even in the case that a plurality of control axes are provided. The number of control axes to which pulses are simultaneously applied can be increased or decreased through a slight alteration of the software used.

FIG. 5 also illustrates connection relations of such computer's internal processing functions with the peripheral devices. The tape reader 13 is under the control of the part program storing program MP1 and the tool data storing program MP2 via the interface 30, and the data input keys 15 are accessible to the editing program EDP via the interface 31. The display device 14 is accessible to the buffer area B1 as well as to the numerical control program NCP via the interface 32. The relay logic controller 18 and the drive unit 19 are controllable respectively via the interfaces 34 and 35 by the numerical control program NCP, to which the machine operation control switches 12a and the manually operated pulse generator 12b are also accessible via the interface 33.

READING OF PART PROGRAM

Figure 7:
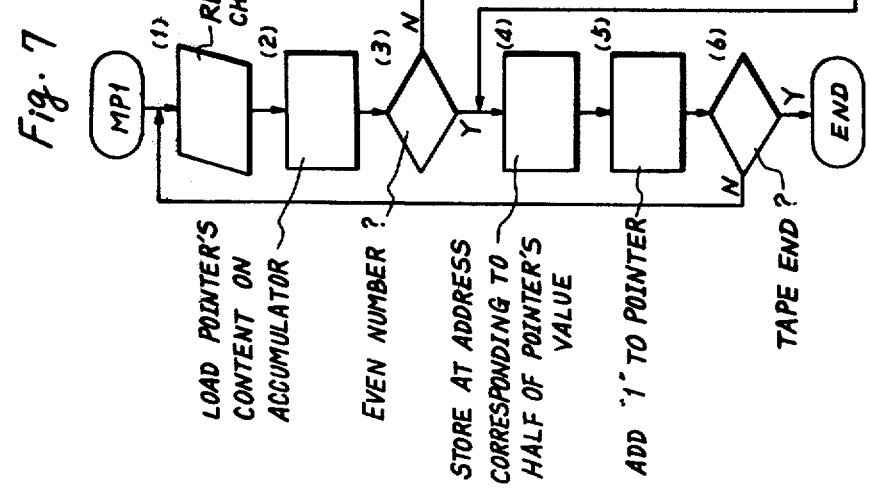
FIG. 7 is a flow chart of a part program storing program.

When the selector 17 on the relay logic control board 12 is switched to the DATA INPUT mode and the selector 16 on the NC control board 11 is switched to the PART PROGRAM READING mode, the part program storing program MP1 as shown in FIG. 7 is called up. With a start instruction subsequently given, the computer 20 executes a part program reading routine. Description will be made hereinunder with this part program reading routine. In step (1), the tape reader 13 is started to read the part program by one character thereof (8 bits per character), and in step (2), the content of an order pointer, not shown, which indicates the order of each character in reading is loaded on one of the accumulators, not shown, which are provided in the processing unit 21 so as to serve as data buffer registers. Step (3) involves checking whether the content of the pointer is an even number or an odd number, and if it is an even number, routine advances to step (4), wherein the read one character is stored at an address whose address number corresponds to the half of a value indicated by the pointer. The pointer is increased by one "1" in step (5), and the routine advances to step (6) so as to check whether the tape end has been attained or not. If no tape end has been attained, the routine advances to step (1) to read the successive one character and then, advances to step (2) to load the content of the pointer in the accumulator. Having been increased by one "1" in the previous step (5), the pointer at this time indicates an odd number, so that routine advances to step (3-1), wherein data (which was read at the second time) being set in another or second accumulator is swapped for empty data appearing at the rest of the bits of the same accumulator. In step (3-2), the data (the first read one character) being stored at the address whose address number corresponds to the half of the value that the pointer indicated before the addition in the previous step (5) is loaded in a further or third accumulator and in step (3-3), is loaded in the second accumulator to be added to the data which was swapped. The data in the second accumulator is stored in step (4) at the address whose number corresponds to the half of the value indicated by the pointer, whereby data of two characters is tored at each address of the memory whose one word comprises 16 bits. The foregoing processings are repeated until the tape end is attained, and thus all the data of the part program are successively read character by character to be stored in the memory.

READING OF TOOL DATA

Figures 6, 8:
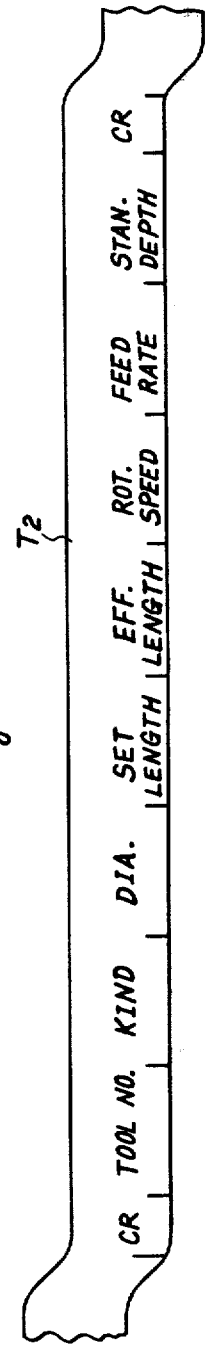
FIG. 6 is an explanatory view illustrating the format of a tool file.
FIG. 8 is an explanatory view illustrating the format of tool data memorized on a tape.
Figure 9:
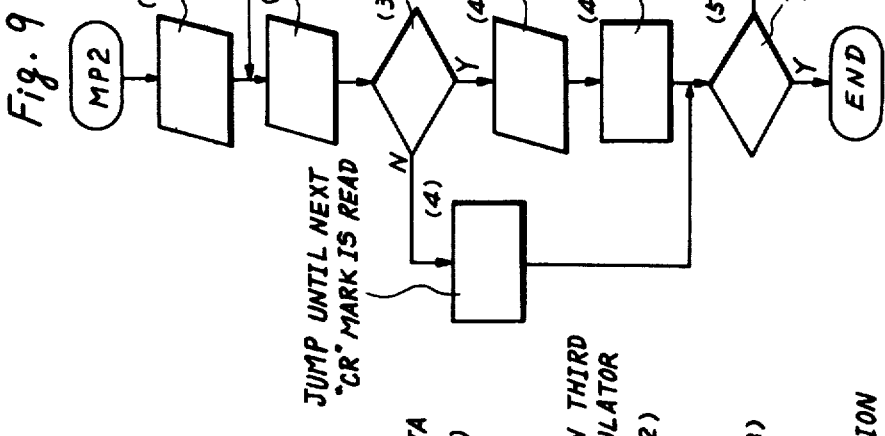
FIG. 9 is a flow chart of a tool data storing program.

This reading of tool data is basically the same as the foregoing reading of the part program. However, another routine is prepared in order to select tool data, corresponding to tool numbers designated, and to store only such tool data in the tool data buffer n5 to n6-1 without successively storing all of the tool data therein. This routine is called up by switching the mode selector 16 to the TOOL DATA READING mode. On the tape T2 storing the tool data, as illustrated in FIG. 8, a tool number represented by a five-digit numeral is stored at the head, following which data relating to tool size, machining conditions and the like are stored in order, and data for one tool is distinguished by means of a CR mark from that for another tool. It is apparent therefore that what follows a CR mark is necessarily a tool number. When instructed to execute the storing routine MP2 as shown in FIG. 9, the computer 20 searches a first CR mark in step (1) and in step (2), reads five characters which are indicative of a tool number following the first CR mark. In step (3), search is made to check whether the same tool number as that which was read exists within the tool data buffer n5 to n6-1 or not, and unless the same tool number exists therewithin, the routine advances to step (4) to jump the successive tool data until the next CR mark is read and then, to step (5) to check whether the tape end has been attained or not. If no tape end has been attained, the routine returns to step (2). If the same tool number is found in step (3), to the contrary, the routine advances to step (4-1) to read tool data following the tool number, to step (4-2) to store the tool data at an area concerned and further, to step (5).

In this manner, data concerning tool numbers (control numbers inherent to respective tools), which correspond respectively to T-codes (identification codes of the tools stored in the tool magazine), are selected to be stored in the respective tool data storing areas of the tool data buffer.

After the part program and the tool data are stored in the foregoing manner, control programs which respectively perform the automatic programming function and the numerical control function are executed selectively. While translating the part program, the computer 20 executes a pulse distribution in accordance with the translated instruction data to thereby output drive pulses to servo systems, so that numerical control operation can be performed on the machine tool.

AUTOMATIC TRANSLATION PROCESSING OF PART PROGRAM

Figure 10B:
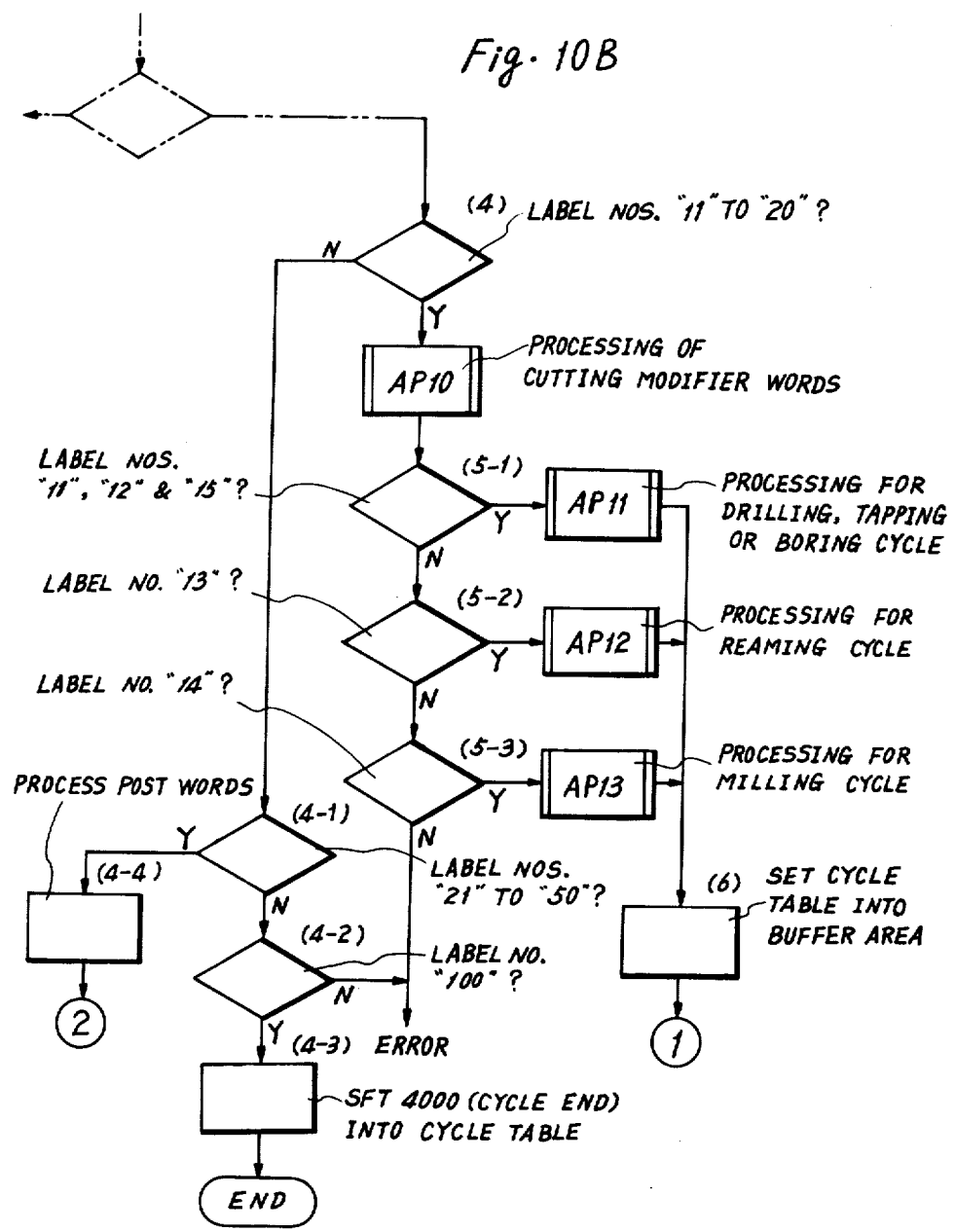

Referring now to FIGS. 10A and 10B, there is shown an execution routine for automatic programming, which is composed primarily of subroutines AP01, AP02, AP03, AP10, AP11, AP12 and AP13. In the execution routine, the part proprogram is read out from the storing buffer on a block-by-block basis, and the read data is then examined as to whether it is a definition statement or a cutting statement. If it is a definition statement, one of the subroutines AP01, AP02 and AP03 is executed to make definitions of a point, a DA (an original position in programming), a line, a circle or a pattern, based upon a label number included in the read definition statement. If it is a cutting statement, on the other hand, the subroutine AP10 is executed to process cutting modifier words, and one of the subroutines AP11, AP12 and AP13 is further executed to calculate instruction data for a tool motion locus depending upon commanded one of kinds of machining so as to thereby make out a cycle table for the commanded kind of machining. A processing for deciding a machining condition by reference to the tool data is executed in the subroutine AP10.

Figure 30:
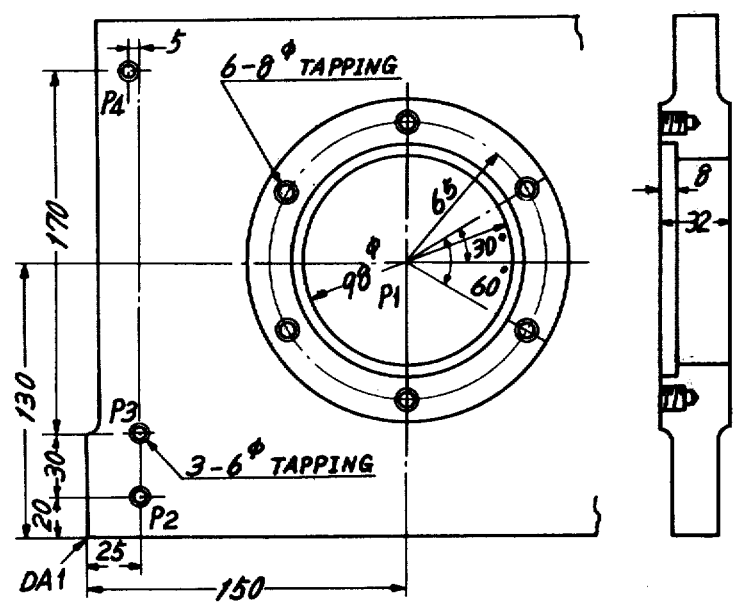
FIG. 30 is illustrative of one example of workpieces to be machined.

Specifically with reference to FIGS. 10A and 10B, the working area for automatic programming and the storing area for point data and the like as shown in FIG. 4 are initialized in step (1), and one block of the part program is read out in step (2). By way of example, FIG. 31 shows a part program for machining a workpiece shown in FIG. 30. Each data unit which is separated from another data unit by one of separation marks („,/,=) is named as one block, on the basis of which reading and data processing are successively performed. It is noted herein that comma (,) within parentheses () is not regarded as a separation mark.

Figure 11:
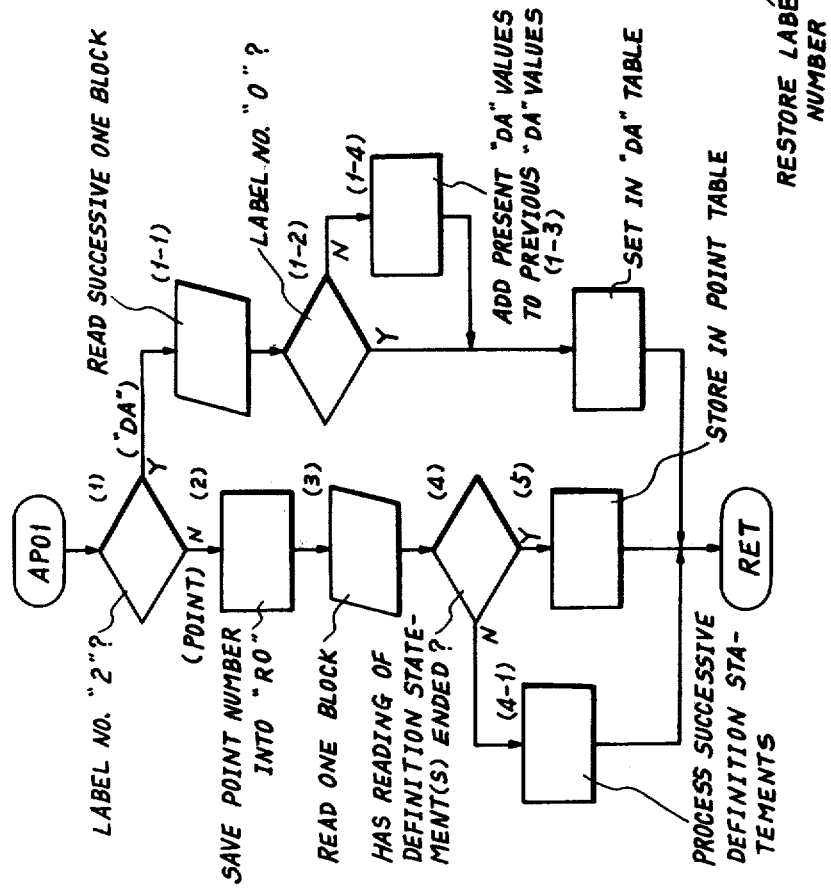
FIG. 11 is a flow chart illustrating a subroutine of automatic programming executed for definition of points and DAs.

In step (3), a label number of this one block is checked to examine whether the one block is a definition statement or a cutting statement. If the one block is a definition statement, it is further checked in step (3-1) what the label number indicates. The routine moves to the subroutine AP01 if the label number indicates "1" or "2", to the subroutine AP02 if it indicates "3" or "4" and to the subroutine AP03 if it indicates "5". In the subroutine AP01, AP02 or AP03, processing is carried out to complete the point table by calculating coordinate values of one point which is on a figure defined by a point, a DA, a line or a circle included in the part program or by calculating coordinate values of a plurality of points which are defined as a pattern. Data in the course of such calculation which data defines the line, the circle or the pattern is put in order so as to be stored in the point table that the memory offers at addresses n7 to n8. This point table is referred to when in the course of processing a cutting statement, a cycle table is made out in accordance with any one of the subroutines AP11, AP12 and AP13. By way of example, the subroutine AP01 for defining a point or a DA will be described hereinafter with reference to FIG. 11.

Step (1) involves checking whether the label number in the read one block symbolizes a point or a DA. If it symbolizes a DA, the successive one block of the part program is read out in step (1-1), and check is made in step (1-2) as to whether the label number of this one block indicates "0" or not. If it indicates "0", the read data itself is coordinate value setting data (coordinate values of the DA), which is then set in a DA table in step (1-3). If the label number does not indicate "0", it is meant that coordinate value setting data for another DA has been designated, and therefore, the present coordinate value setting data is added to the previous coordinate value setting data, the sum of which is then stored in the DA table. The routine returns to the main routine upon completion of this setting into the DA table.

After reading of a further block of the part program in step (2) of the main routine, the routine may advance again to the foregoing step (1) of the subroutine AP01. If the label number of the read block is found in step (1) to symbolize a point, the routine moves to step (2) to save the point number, to step (3) to read out the subsequent block of the part program and further to step (4) to check whether the reading of one or more definition statements following by the label number has ended or not. If it has ended, coordinate values which have been read out in step (3) are stored, together with the point number having been saved in step (2), in the point table. If the reading of all of those definition statements has not ended yet, the routine moves to step (4-1) to process the successive definition statements and then, returns to the main routine. In this step (4-1), the processing is carried out to calculate values of a new point based upon the previous definition statement and the successive definition statement or statements and then, to store the coordinate values of the new point, together with the point number, in the point table.

In the case where one block read out in step (2) of the main routine includes a label number symbolizing a line or a circle, the subroutine AP02 is executed, whereby coordinate values defining the line or the circle are stored in the point table. In addition, coordinate values of a point which is defined on an intersection of a line with a circle, of a line with another line, or of a circle with another circle can be calculated to be stored as new point data in the point table. In the case where a label number symbolizing a pattern is found in step (3-1) of the main routine, the subroutine AP03 is executed, through which the coordinate values of each of the points which have finally been patternized are calculated to be stored in the point table.

Figure 12:
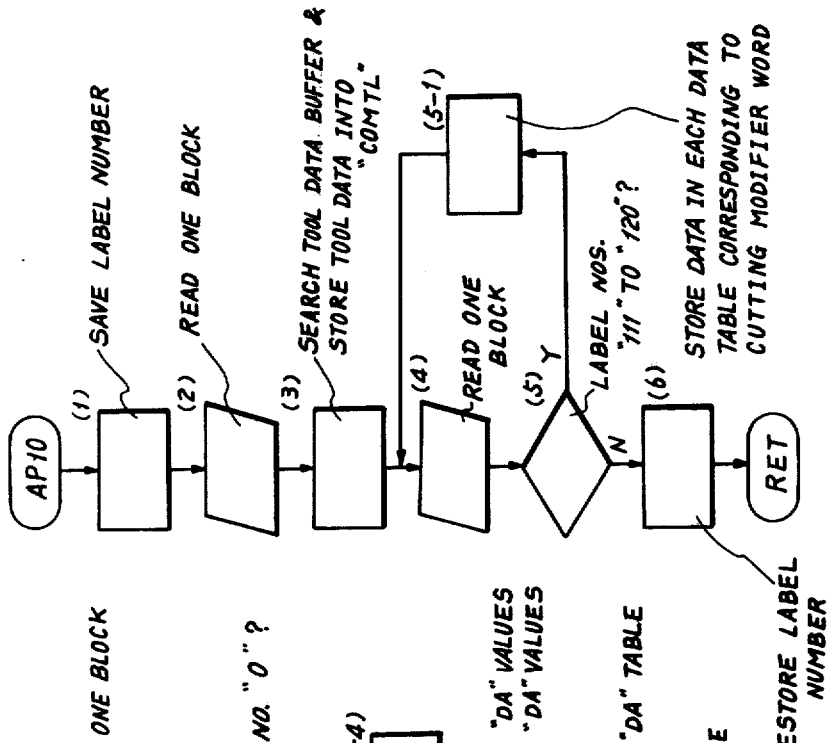
FIG. 12 is a flow chart illustrating another subroutine of automatic programming executed for processing of cutting modifier words.

Upon completion of processing a series of the definition statements, the processing of cutting statements are performed by reference to the coordinate values of these defined points. When in step (3) of FIG. 10A, one block of the part program is found to be a cutting statement, the routine advances to step (4) and if the one block includes a keyword symbolized by one of the label numbers "11" to "20", it further advances to the subroutine AP10 to first process cutting modifier words included in the one block. This subroutine AP10 will now be described with reference to FIG. 12. Step (1) involves saving a label number which constitutes the first block of the cutting statement. This label number is representative of the kind of machining. Since the first cutting statement of the part program exemplified in FIG. 31 is "BOR" (boring) symbolized by label number "15", this label number "15" is saved. The successive unit block of the part program is read out in step (2). Since the second block of the cutting statement is always a tool number, the reading in step (2) effects reading of the tool number. In step (3), the tool data buffer is searched to find out tool data corresponding to the read tool number, and the tool data concerned is transferred into the tool data table COMTL. Step (4) involves reading out one block following the tool number. Since the one block next to the tool number provides a cutting modifier word symbolized by one of the label numbers "111" to "120", the routine then advances from step (5) to step (5-1) to decode the cutting modifier word and to store a commanded value, accompanying by the cutting modifier word, in each table corresponding thereto and returns to step (4). The routine of the steps (4) to (5) to (5-1) is repeated a number of times corresponding to the number of the cutting modifier words. When no cutting modifier word is read out, the routine advances to step (6) to restore the label number which was saved in step (1) and then, returns to the main routine. The restored label number is checked through steps (5-1), (5-2) and (5-3) of the main routine, as shown in FIG. 10B. The routine advances to the subroutine AP11 if one of a drilling cycle (label number "11"), a tapping cycle (label number "12") and a boring cycle (label number "15") is designated, to the subroutine AP12 if a reaming cycle (label number "13") is designated and to the subroutine AP13 if a milling cycle (label number "14") is designated.

As mentioned previously, the first cutting statement in this particular embodiment instructs a boring cycle, so that the label member indicates "15", thus causing the routine to advance to the subroutine AP11. This subroutine AP11 is a subroutine for completing cutting cycle tables by reference to the tool data file COMTL, the pint table and the DA table.

The cutting cycle tables are prepared in the working area n6 to n7-1 for automatic programming and have cycle patterns which are determined in correspondence to the kinds of machinings, respectively. FIG. 14 shows the cycle table for use in each boring cycle, in which there are provided, from the top, a designation blank (TOOL #) for a tool to be used, a rapid feed advanced end designation blank (Xa, Ya, Za), a feed rate designation blank (F), a spindle rotational speed designation blank (S), a cutting feed advanced end designation blank (Xb, Yb, Zb) and a rapid feed retracted end designation blank (Xc, Yc, Zc). The designation blanks TOOL#, F and S are set respectively with corresponding data being stored in the tool data file COMTL, while other designation blanks Xa, Ya, Za, Xb, Yb, Zb, Xc, Yc and Zc are set respectively with data which are being stored in the point table and the DA table or are calculated by reference thereto.

Figure 13:
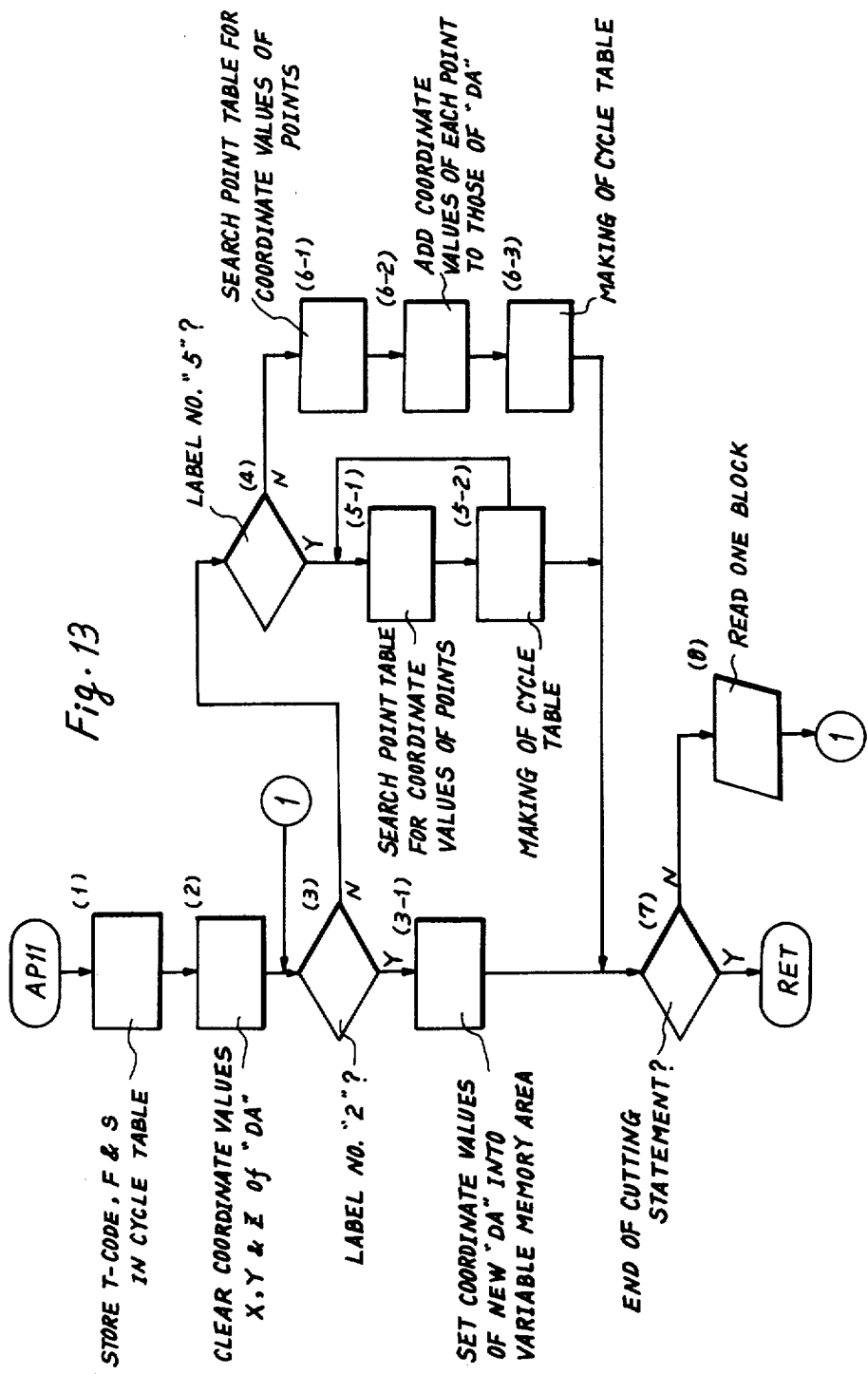
FIG. 13 is a flow chart illustrating another subroutine of automatic programming executed for completing cycle tables.

Referring to FIG. 13, a routine for completing such a cycle table will now be described. In step (1) of this routine, a T-code, a feed rate and a spindle rotational speed which have been determined in connection with a tool number are stored respectively in the corresponding designation blanks TOOL#, F, S by reference to the tool data table COMTL. Coordinate values of a DA being stored in a variable memory area are cleared in step (2), and check is made in step (3) as to whether the label number indicates "2" or not. The check in this step results in checking the label number of the one block which was last read in the subroutine AP10. If the label number indicates "2", the routine advances to step (3-1) to set coordinate values of a DA, having been stored in the DA table, into the variable memory area, moves to step (7) to check whether the cutting statement has come to an end or not and returns to the main routine if it has. If it has not come to an end, on the other hand, the routine advances to step (8) to read out the next unit block and returns to step (3).

A label number of the read unit block is checked in step (3), with the result of advancing the routine to step (4) unless it indicates "2". This step (4) involves a further checking of the label number. The routine advances to steps (6-1), (6-3) to process point data if the label number is "1", but advances to steps (5-1) and (5-2) to process point data if the label number is "5". The point process routine from step (6-1) to step (6-3) and the point process routine from step (5-1) to step (5-2) performs basically the same processing. Namely, in each of the process routines, coordinate values of each of the points are obtained by searching the point table based upon a commanded point number and, after being added respectively to the coordinate values of the DA which have been set in the variable memory area, are set into the designation blank of the cycle table corresponding to each point. However, the difference between both of the process routines appears in that the process routine from step (5-1) to step (5-2) is repeated a number of times corresponding to the number of points which are defined as a pattern. Upon completion of the processings in steps (6-1) to (6-3) or (5-1) and (5-2), the routine advances to step (7) to check whether the cutting statment has come to an end or not and, if it has come to an end, returns to the main routine. Unless the statement has come to an end, the next unit block is read out in step (8) and thereafter, the processings in steps (3) to (8) are repeatedly executed. The routine returns to the main routine shown in FIGS. 10A and 10B to advance to step (6) thereof, in which the cycle table having been completed through the subroutine AP11 is output to be set in the buffer area B1. The memory capacity of this buffer area B1 is determined so as to be able to store all of the blocks of machine part instructions translated from a single source instruction, or a cutting statement including one or more point designations, of the part program. Data set into the cycle table is executed at such a frequency that no vacancy occurs in the buffer area B1 and, when no vacancy occurs, is caused to wait until the occurrence of a vacancy. When all of the data in the cycle table have been output to the buffer area B1, the routine returns to step (2), so that the processings for the successive definition or cutting statement are repeated.

The memory area for part programs processed in the above-described manner is composed of a tape input buffer having the memory addresses n3 to n4-1 and an MDI input buffer having the memory addresses n4 to n5-1. Translation is performed with the part program, having been stored in the tape input buffer, when the AUTOMATIC OPERATION mode is selected and with a part program, having been stored in the MDI input buffer, when the MDI OPERATION mode is selected. The part program having been stored in the MDI input buffer is that which was manually input using the data input keys 15 in the MANUAL DATA INPUT mode selected by means of the mode selector 16 on the NC control board 11. It is understood, accordingly, that the manually input part program can also be translated through the same routine as for the tape-input part program, and that such mode selection is carried out to select one of the input buffers from which the part program to be translated will be read out.

NUMERICAL CONTROL PROGRAM (NCP)

This program NCP serves primarily to control pulse distribution, in which pulses are applied to the servo systems in accordance with one of the machine part instructions having been stored in the buffer area B1, and operations instructed by the auxiliary function commands. The program NCP establishes a data setting routine NCBR responsive to interruptions, which are based respectively upon real time clock pulses generated by the central processing unit 21 at a frequency of 5 msec., and a pulse generation routine PGEN responsive to interruptions generated from the counter 41 of the interface 35. In the data setting routine NCBR, data processings are performed to read out one block of the machine part instructions form the buffer area B1, to set the read data into the NC table after decoding and to set initial values for pulse distribution calculation in the data table, in addition to outputting auxiliary function commands to the relay logic controller 18. Further data processings are also performed to calculate a pule generation period KT, to be set into the counter 41, based upon a commanded feed rate and then, to set the period KT into the data table. In the pulse distribution routine PGEN, each time an interruption is effected based upon the count-up operation of the counter 41, the necessity of distributing one pulse is judged with respect to each axis and drive pulses are output to the servo systems in accordance with results of such judgements.

Figure 15:
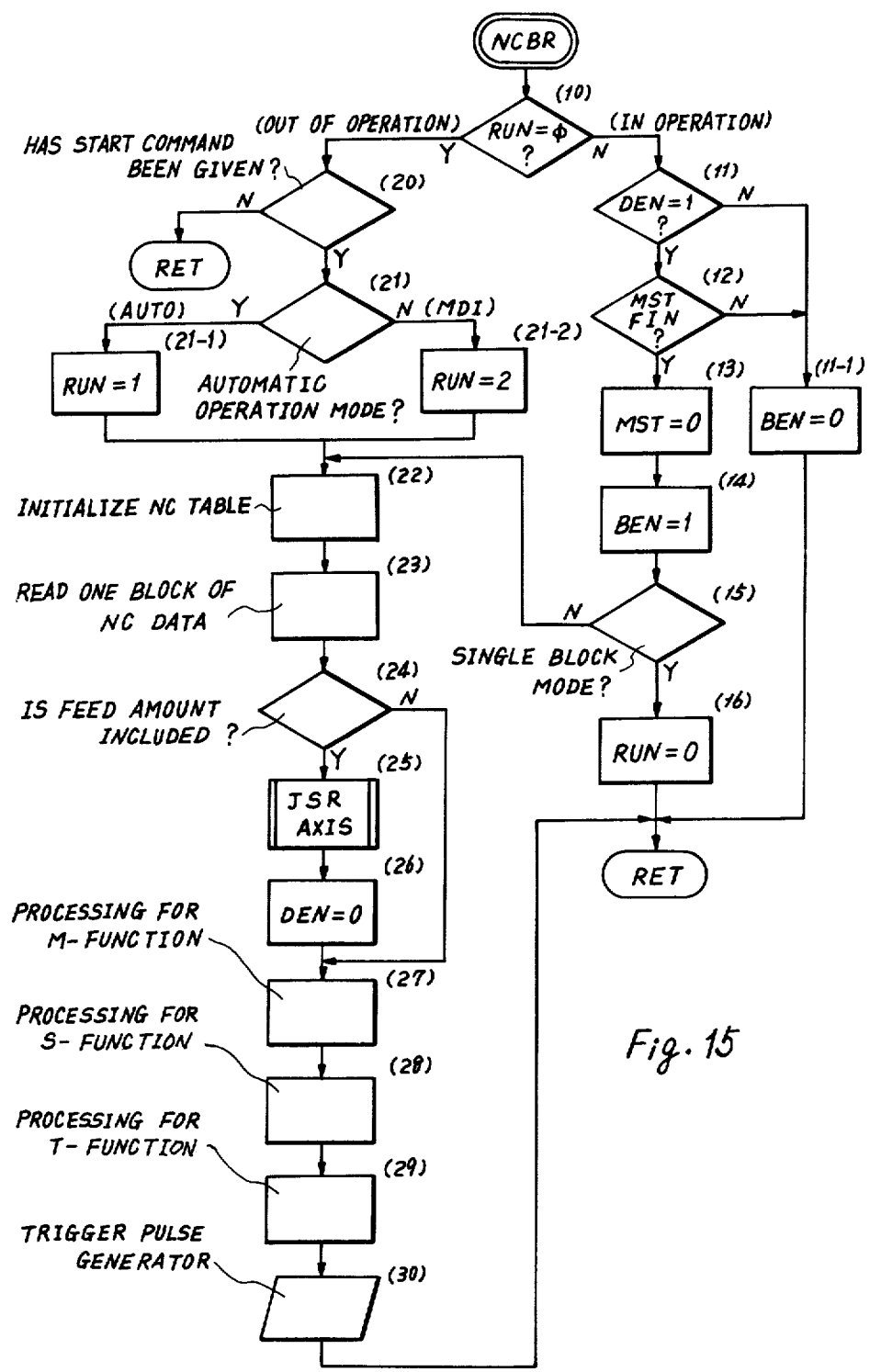
FIG. 15 is a flow chart illustrating a data setting routine of numerical control.

The data setting routine NCBR will now be described in detail with reference to FIG. 15. Step (10) involves checking whether a RUN flag is "0" or not, that is whether the machine tool is out of operation or in operation. It is to be noted that the "out-of-operation" means the state which is before the machine tool is started and during which the RUN flag is maintained reset, and that the "in-operation" means the state which is other than the above-mentioned state and during which the RUN flag is maintained set. Accordingly, when the machine tool is out of operation, the routine cannot advance to step (21) as long as no start command is given.

When the machine tool is in operation, the routine advances to step (11), in which a check is made as to whether pulse distribution operation for one block of the machine part instructions has been completed or not. If it has been completed, a check is made in step (12) as to whether an auxiliary function has been completed or not. Only when they both have been completed, does the routine advance to step (13) to clear an auxiliary function flag, to step (14) to set "1" in a BEN flag for indicating the beginning of the next pulse distribution operation and to step (15) to check whether the mode selector 17 has still been switched to the SINGLE BLOCK mode or not. Only when this mode has still been selected, does the routine advance to step (16) to set "0" in the RUN flag and return to the base routine, that is the automatic programming routine AP. Consequently, the machne tool is caused to be out of operation and is inhibited from restarting its operation unless the start command is given again. If the SINGLE BLOCK mode has not been selected in step (15), the routine advances to step (22). If either the pulse distribution operation or the auxiliary function has not been completed yet, the routine advances from step (11) or (12) to step (11-1) so as to set "0" in the BEN flag and returns to the base routine.

If the machine tool is out of operation, a check is made in step (20) as to whether the start button is in the "ON" state or not and if it is in the "ON" state, a check is further made in step (21) as to whether the AUTOMATIC OPERATION mode has been selected or whether the MDI OPERATION mode has been selected. The RUN flag is set with "1" in step (21-1) if the AUTOMATIC OPERATION mode has been selected, but it is set with "2" in step (21-2) if the MDI OPERATION mode has been selected. The routine further advances to initialize the NC table in step (22) and to read out one block of the machine part instructions, having been stored in the buffer area B1, in step (23) for setting into the NC table. A check is made in step (24) as to whether data of the one block being set in the NC table includes one or more feed amount data or not. If no feed amount data are included, the routine advances to execute processings for M, S and T-functions respectively in steps (27), (28) and (29). The M-function is a control function for instructing start, stop, clockwise rotation and counterclockwise rotation of the machine tool spindle, tool exchange and the like; the S-function is a control function for designating the rotational speed of the machine tool spindle; and the T-function is a control function for selecting a desired tool based upon a T-code associated therewith. If included in the read one block, any one of these functions is output to the relay logic controller 18.

If the feed amount data is included, the routine is caused in step (25) to jump to a subroutine AXIS, in which data set into the data table is executed. This subroutine AXIS will be described hereinafter with reference to FIG. 16. A check is made in step (1) as to whether the pulse generator has been triggered or not. If it has been triggered, a jump is effected to step (9), while if it has not been triggered, one or more control axes to which drive pulses are to be supplied are searched by reference to the NC table in step (2) and are registered respectively in drive axes designation flags, SWI, provided in the data table, in step (3). A check is made in step (4) as to whether the commanded type of control is a positioning (point-to-point) control or a contouring control, and if the positioning control is instructed, one of the designation flags SWI is registered in a major axis flag SW in step (4-1) so as to determine a major axis since in the previous step (3), only one control axis has been registered in the one of the designation flags SWI. If the contouring control is instructed, on the other hand, the routine advances to step (5), in which one of the control axes which is instructed to move through the largest distance is found out to be determined as the major axis. The major axis flag SW is set with "0" if the major axis is the X-axis, with "1" if the Y-axis and with "2" if the Z-axis.

The routine further advances to step (6) to read out a commanded feed rate from the NC table, step (7) to calculate a pulse generation period KT and step (8) to set the generation period KT in the data table. In this step, feed amount data for each control axis is read out from the NC table so as to be set as an initial value in an area MOVEV of the data table which stores the rest of a feed amount. Step (9) involves comparison of the calculated period KT with a predetermined pulse generation period corresponding to a boundary feed rate, which forms the basis of deciding the necessity of speed-up and slow-down controls. Speed-up and slow-down flags are set if such controls are decided to be necessary, and the routine then returns to the routine shown in FIG. 15. After returning to step (25), the routine advances to step (26) to clear the pulse distribution completion flag and steps (27), (28) and (29) to process the M, S and T-functions. The routine further advances to step (30) to set "0" in the counter 41 as well as to trigger the operation of the pulse generator and finally, returns to the base routine. Consequently, as soon as one clock pulse is supplied to the counter 41, the same generates one borrow pulse to effect an interruption, responsive to which the pulse distribution routine PGEN is executed immediately.

Figure 17:
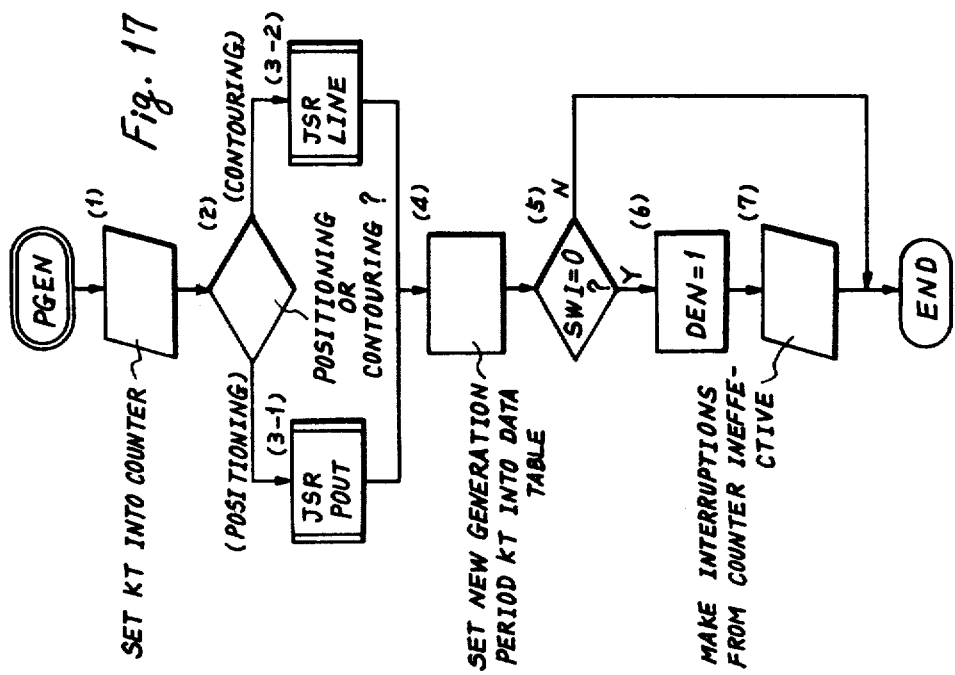
FIG. 17 is a flow chart illustrating a pulse distribution subroutine of numerical control.

The pulse distribution routine PGEN will now be described with reference to FIG. 17. In step (1) of this routine PGEN, the pulse generation period KT being set in the data table is read out to be preset into the counter 41. The counter 41, when preset with the period KT, subtracts from the value of the period KT the number of clock pulses input from the pulse generator 40 and generates an interruption pulse when the content thereof is reduced to zero "0". In step (2), reference is made to the drive axis designation flags SWI so as to check whether a plurality of axes are being instructed to be driven or not, in other words whether a positioning control or a contouring control is being instructed. If the positioning control is being instructed, the routine is caused in step (3-1) to jump to a subroutine POUT, in which one pulse is output to the axis designated by the major axis flag SW. If the contouring control is being instructed, the routine is caused in step (3-2) to jump to a subroutine LINE, in which one pulse is output to the major axis and calculation is made based upon the feed amount of the major axis and the feed amount of another control axis so as to decide whether one pulse is to be output also to another control axis. The status of the speed-up and slow-down flags which have been set or reset in the data setting routine NCBR are checked in step (4). If the speed-up flag or the slow-down flag is in set condition, the pulse generation period KT is increased or decreased on a step-by-step basis, so that a new pulse generation period KT which has been adjusted to achieve the speed-up control or the slow-down control is set in the data table. In step (5), a check is made as to whether pulse distribution to one or more control axes is still being instructed by the flags SWI or not. If it is no longer being instructed, the routine moves to step (6) to set "1" into the pulse distribution completion flag DEN and to step (7) to make ineffective the interruptions from the counter 41 in a well known manner and returns to the base routine. If the pulse distribution is still being instructed, routine returns directly to the base routine.

Figure 18:
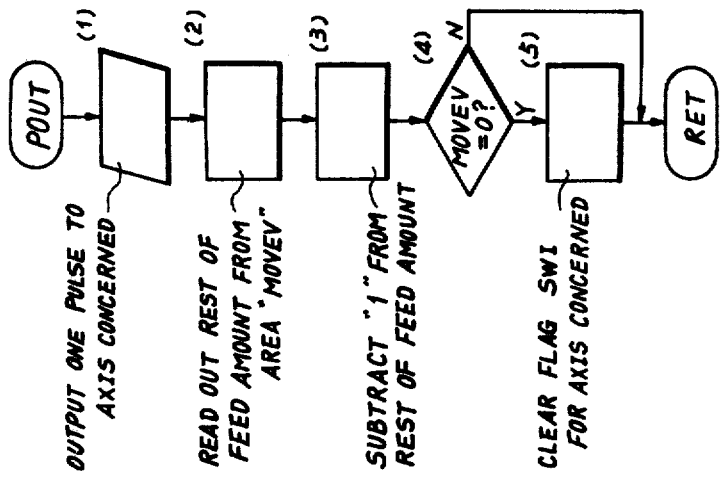
FIG. 18 is a flow chart illustrating another subroutine of numerical control executed for pulse distribution in a positioning control.

FIG. 18 shows the subroutine POUT for positioning control, wherein one pulse is output to the control axis, designated by the major axis flag SW, in step (1), and the rest of the feed amount for the control axis is read out from the area MOVEV of the data table in step (2). The routine advances to step (3) to subtract "1" from the rest of the feed amount and to step (4) to check whether the rest of the feed amount has been reduced to "0" or not. If it has become "0", the drive axis designation flag SWI associated with the control axis is cleared in step (5), and routine then returns to step (3-1) of the routine PGEN.

Figure 19:
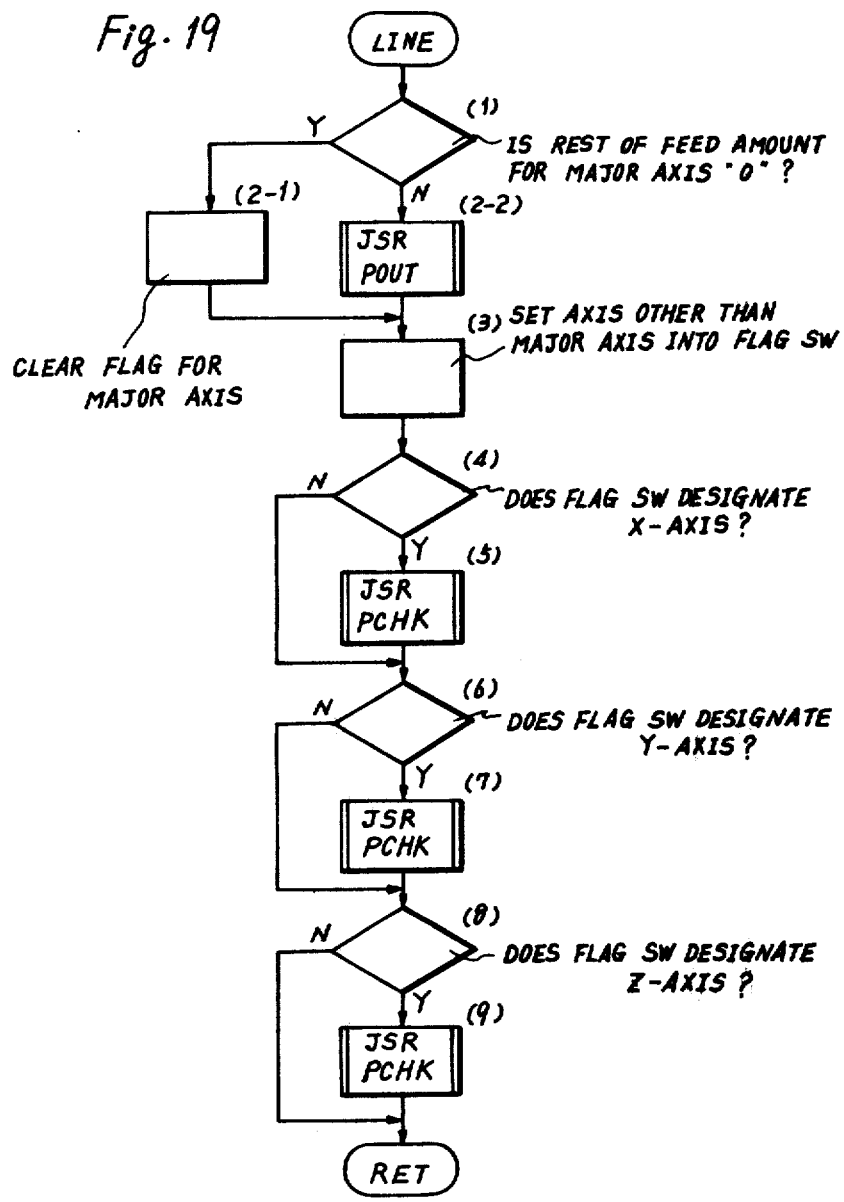
FIG. 19 is a flow chart illustrating another subroutine of numerical control executed for pulse distribution in a contouring control.
Figure 20:
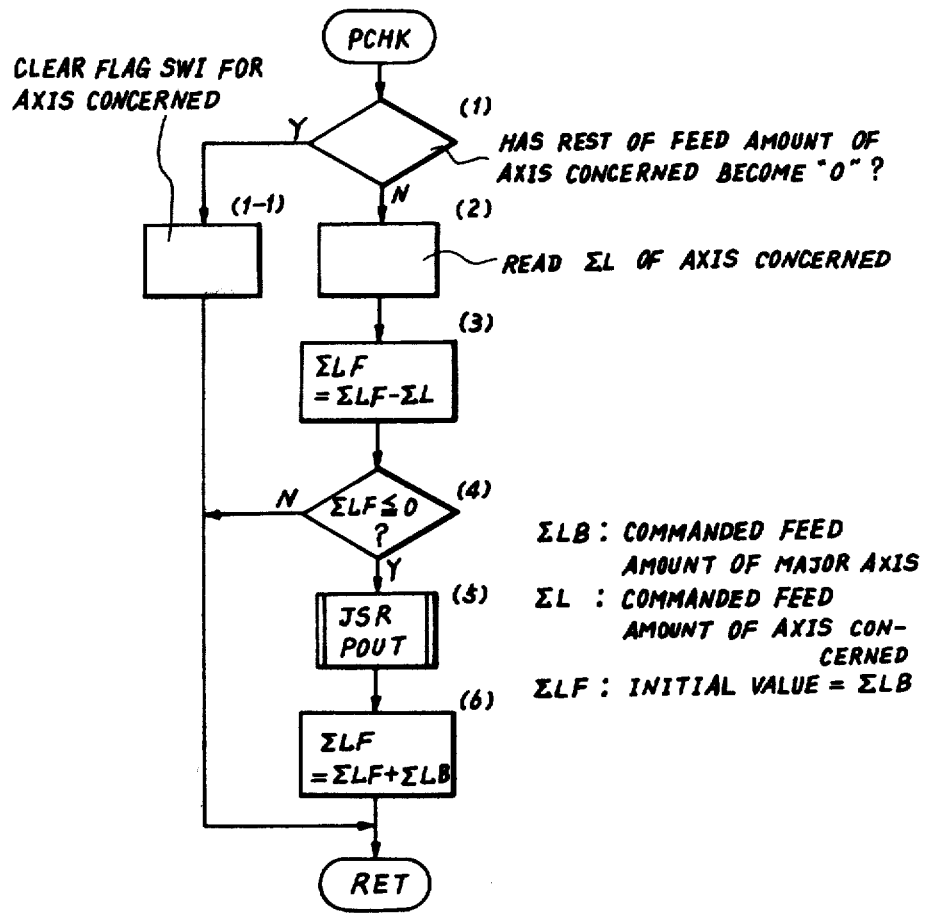
FIG. 20 is a flow chart illustrating another subroutine of numerical control executed for pulse distribution to axes other than a major axis.

Referring now to FIG. 19 illustrative of the subroutine LINE, a check is made in step (1) as to whether the rest of a feed amount for the major axis is "0" or not, and if it is "0", the drive axis designation flag SWI now designating the major axis is cleared in step (2-1). If it is not "0", the routine is caused in step (2-2) to jump to the above-described subroutine POUT, with the result of outputting one pulse to the major axis and subsequently, of subtracting "1" from the rest of the feed amount for the major axis, and then, returns to the subroutine LINE. In step (3), the major axis flag SW is set with a numeral, for example "0", "1" or "2" indicating any other control axis than the major axis, and it is checked in steps (4) to (9) as to whether such any other control axis is the X, Y or Z-axis and whether one pulse is to be output also to such any other control axis or not. Namely, processings are performed so as to search for one of the control axes to be controlled simultaneously with the major axis and to decide the necessity of supplying one pulse to the searched control axis. Each of steps (5), (7) and (9) involves causing the routine to jump to a subroutine PCHK programmed as shown in FIG. 20 for checking whether to output one pulse or not.

In step (1) of this routine PCHK, a check is made as to whether the rest of the feed amount for the control axis concerned which was searched in any one of the previous step (4), (6) and (8) of the routine LINE has been reduced to "0" or not. If it has been reduced to "0", the routine advances to step (1-1) to clear the drive axis designation flag SWI designating the control axis concerned and returns to the main routine. Unless it has become "0", the routine advances to step (2) to read the commanded feed amount $\Sigma L$ of the control axis concerned being set in the data table, to step (3) to perform a calculation of $\Sigma LF = \Sigma LF - \Sigma L$ and further to step (4) to check whether an inequality $\Sigma LF \leq 0$ is satisfied or not. If the inequality $\Sigma LF \leq 0$ is satisfied, the routine is caused in step (5) to jump to the subroutine POUT for outputting one pulse to the control axis concerned and thereafter, returns to the subroutine PCHK. In the successive step (6), $\Sigma LF$ is renewed by adding the commanded feed amount $\Sigma LB$ of the major axis to the previous $\Sigma LF$. It will be understood therefore that because the initial value of $\Sigma LF$ is determined to be the commanded feed amount $\Sigma LB$ of the major axis, calculations in steps (3) and (4) result in outputting one pulse also to the control axis concerned each time the cumulative value $\Sigma L$ becomes larger than $\Sigma LB$. In this connection, each drive pulse is output to the major axis at the same period as the pulse generation period KT, whereas it is output to the control axis concerned other than the major axis at a period which depends upon the ratio of the feed amount of the control axis concerned to that of the major axis and which is longer than the pulse generation period KT.

The above-described pulse distribution routine PGEN is called up by the interruption pulse generated from the counter 41 and is executed at a period which is determined by the value KT set in the counter 41. In case of positioning control, drive pulses are supplied only to one control axis at a frequency corresponding to a commanded feed rate. In case of contouring control, drive pulses are supplied to the control axes under simultaneous control at respective frequencies which are determined in accordance with a commanded feed rate and feed amounts of the control axes. In both cases, the rest of a feed amount for each axis is subtracted by the drive pulses supplied thereto. When the rest of the feed amount for each axis is reduced to "0", the foregoing pulse distribution is completed. With an auxiliary function subsequently completed, the routine advances to step (22) of FIG. 15 unless the SINGLE BLOCK mode has been selected. Accordingly, the subsequent unit block of the machine part instructions is read out and set into the data table immediately upon completion of the auxiliary function, whereby pulse distribution for the unit block is initiated again.

The automatic programming routine is executed within a spare time during which neither the data setting routine NCBR nor the pulse distribution routine PGEN is called up. In the automatic programming routine, the translation of the part program into the machine part instructions and the storing of the same into the buffer area B1 are carried out as a base routine of the central processing unit 21.

EDITING PROGRAM (EDP)

This editing program EDP comprises a first editing program for revising and editing data concerning the part program and a second editing program for revising and editing data concerning the tools. These programs are different from each other in a respect that the former is adapted to process data represented in the form of a so-called "ASCII (American Standard Code of Information Interchange) code", while the latter is adapted to process data represented in the form of binary code. However, the first and second editing program are so programmed as to provide the respective process routines which are substantially the same. The editing programs, being stored at memory addresses n2 to n3-1, are called up by switching the mode selector 17 on the relay logic control board 12 to the DATA INPUT mode. This switching of the selector 17 to the DATA INPUT mode causes the RUN flag to be cleared, whereby the machine tool is brought into the out-of-operation state. Only in this state, each command input by the use of the data input keys 15 for data revision and editing is acceptable to the computer 20 as effective.

The first editing program for processing data represented in the form of ASCII code will be described hereinafter with reference to FIGS. 21 to 29. This program is called up and caused to be ready for data processings by switching the mode selector 16 on the NC control board 11 to either the PART PROGRAM RE- VISION mode or the DATA INPUT mode. A memory pointer is set to indicate the first address of the part program storing buffer, namely the address n3 shown in FIG. 4 when the PART PROGRAM REVISION mode is selected, while it is set to indicate the first address of the MDI storing buffer, namely the address n4 when the DATA INPUT mode is selected. Further, the first editing program is programmed to achieve a character processing function for performing addition, cancellation and alteration of data on a character-by-character basis and a data line processing function for performing addition and cancellation of data on a line (block)-by-line basis.

Figure 21:
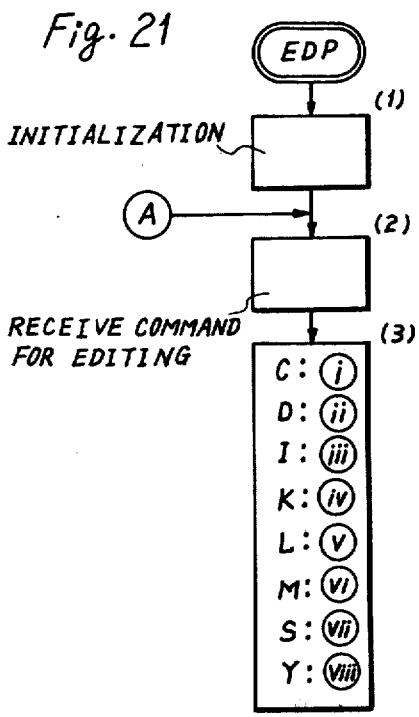
FIG. 21 is a flow chart illustrating a base routine of an editing program.

FIG. 21 shows a common routine used in achieving these functions. With this routine started, predetermined registers are initialized in step (1) and a command for editing is received in step (2), whereby in step (3), the routine is caused to search one of routines (1) to (viii) which is designated by the received command. The routine (i) is provided for replacement of character, the routine (ii) for cancellation of character, the routine (iii) for insertion of character, the routine (iv) for cancellation of data line, the routine (v) for displacement of the pointer address through data lines, the routine (vi) for displacement of the pointer address through characters, the routine (vii) for search, and the routine (viii) for display. Upon completion of processing in each of these routines (i) to (viii), the routine returns to step (2) of the common routine and is caused to wait until the subsequent command for editing is received.

Figure 22:
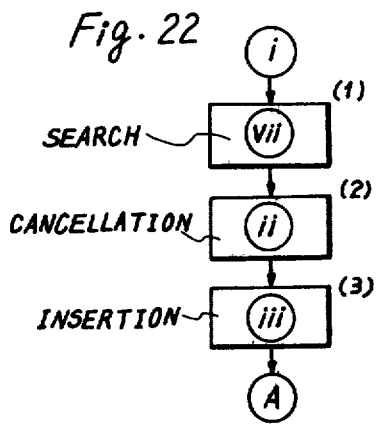
FIG. 22 is a flow chart illustrating a character replacement routine of the editing program.

Called up by a command [C] is the character replacement routine (i), in which as shown in FIG. 22, the search routine (vii), the character cancellation routine (ii) and the character insertion routine (iii) are serially executed, whereby a searched character is replaced with a new one.

Figure 28:
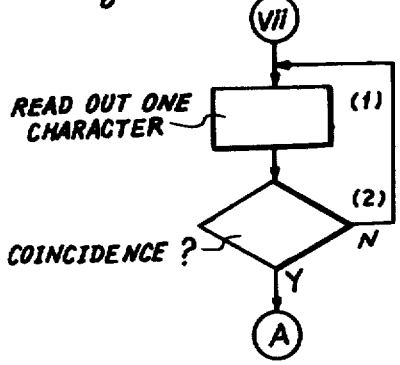
FIG. 28 is a flow chart illustrating a search routine of the editing program.

In the search routine (vii), as shown in FIG. 28, any one character is read out from any address indicated by the pointer in step (1), and check is made in step (2) as to whether the read character is in coincidence with a character intended or not. If no coincidence occurs, the step for reading out the successive character is repeated until the intended character is found.

Figure 23:
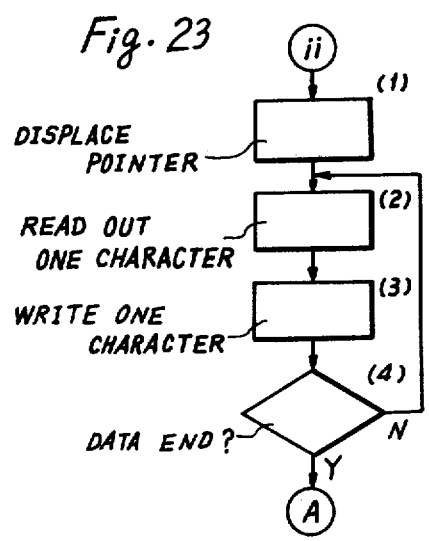
FIG. 23 is a flow chart illustrating a character cancellation routine of the editing program.

The character cancellation routine (ii) includes processings wherein assuming now that one character which is at a present address indicated by the address pointer is to be cancelled, another character following the one character is read out and stored at the present address. FIG. 23 illustrates an example of routine (ii), through which such processings are carried out. In step (1), the pointer is displayed by the number of character or characters to be cancelled. One character that the pointer presently indicates is read out in step (2) and is stored at an address that the pointer indicated before being displaced, in step (3). Check is made in step (4) as to whether such steps (2) and (3) have been executed a number of times corresponding to the number of characters which follow the character or characters to be cancelled, and if the result is "Yes", the routine returns to the base routine. It is noted, of course, that the pointer address is increased by one each time the routine returns to step (2).

Figure 24:
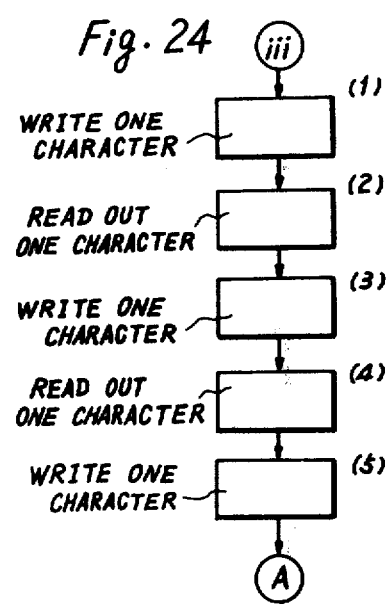
FIG. 24 is a flow chart illustrating a character insertion routine of the editing program.

FIG. 24 illustrates the character insertion routine (iii), which is called up by a command [I]. Step (1) involves storing one character, to be inserted, in a predetermined area. In steps (2) and (3), one address into which the one character is to be stored is blanked by shifting each of characters which have been stored and which are to in turn follow the one character to be inserted. In steps (4) and (5), the one character is read out from the predetermined area and is stored into the blanked address. Accordingly, if this routine (iii) is repeated, no matter how many characters there may be to be inserted, the same can be freely inserted between any one character desirably designated by the pointer and another character following such any one character.

Figure 25:
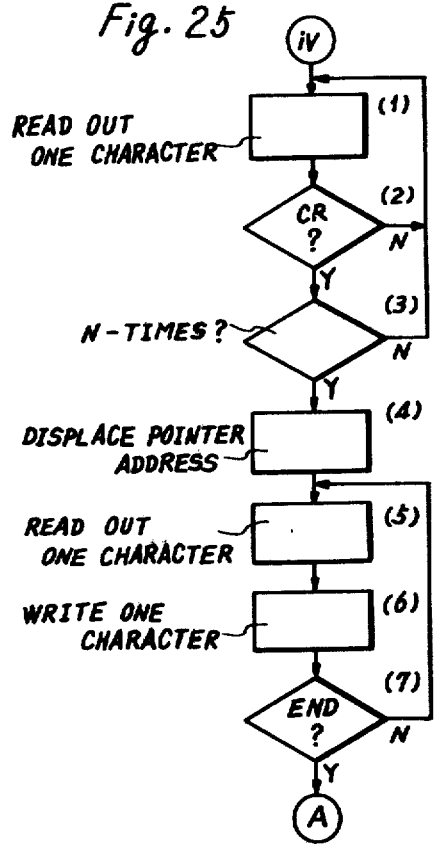
FIG. 25 is a flow chart illustrating a data line cancellation routine of the editing program.

Illustrated in FIG. 25 is the data line cancellation routine (iv), which is called up by a command [K]. Each of data lines of the part program is distinguished by a CR mark from another data line. When the pointer is set to indicate a first one of addresses at which a first one of data lines to be cancelled is being stored and the number of the data lines is designated, the reading-out of characters is initiated and continues until the CR mark is read out by the same times as the number of the data lines. Then, the address pointer is displaced by the number of characters which have been read out during this reading-out, and the same processings as in the character cancellation routine (ii), as mentioned previously, are then executed, so that data can be cancelled on the line-by-line basis.

Figure 26:
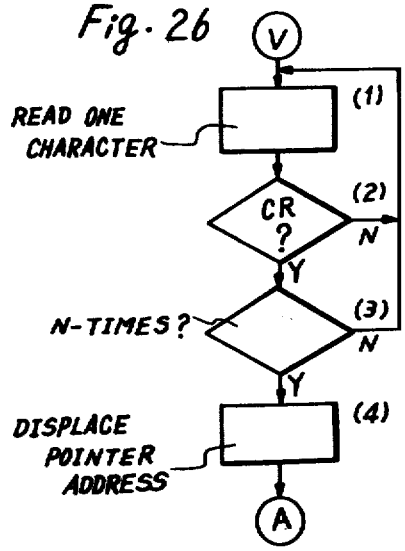
FIG. 26 is a flow chart illustrating another routine of the editing program for displacing a pointer address on a line-by-line basis.

FIG. 26 illustrates the routine (v) for displacing the pointer address from a present position through n-data lines and a command [L] is input to call up this routine (v). In the same manner as the first half of the routine shown in FIG. 25, characters are read out until the CR mark is read out the same number of times as the number of data lines through which the pointer address is to be displaced, and the same is then displaced, whereby the routine (v) is achieved.

Figure 27:
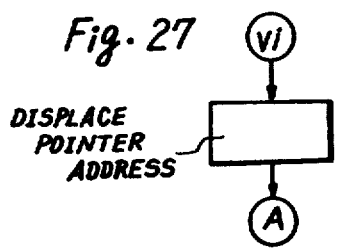
FIG. 27 is a flow chart illustrating another routine of the editing program for displacing the pointer address on a character-by-character basis.

FIG. 27 illustrates the routine (vi) for displacing the pointer address from a present address through n-characters. A command [M] is input to call up this routine (vi), wherein "n" is added to or subtracted from the present pointer address, whereby the pointer address is displaced.

Figure 29:
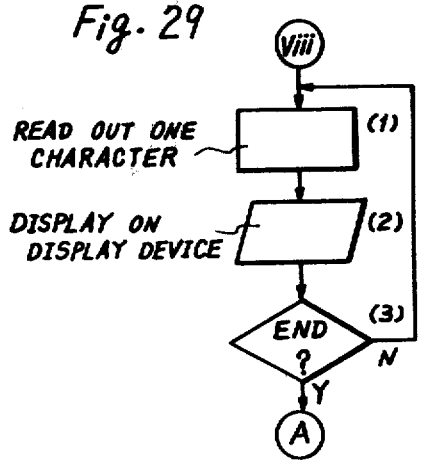
FIG. 29 is a flow chart illustrating a display routine of the editing program.

FIG. 29 illustrates the display routine (viii), which is called up by a command [Y]. Processings are carried out to read out one character from the memory in step (1) and to display the read-out one character on the display device 14 in step (2). If the display capacity of the device 14 becomes full or if data lines of the number designated are displayed, this routine is so controlled in step (3) as to prevent the subsequent reading-out.

The provision of such an editing program EDP permits partial cancellation of the part program, addition of data into the part program and replacement of instructions included in the part program.

In order to control the machine tool in accordance with the revised part program, the mode selector 17 is switched to the AUTOMATIC OPERATION mode, and the start button is depressed. The automatic programming function as well as the numerical control function are brought into action so as to translate the revised part program into machine part instructions and to initiate pulse distribution processing, whereby the operation of the machine tool is restarted immediately.

When the revision of the part program is needed, one or more single source instructions thereof and a plurality of blocks of machine part instructions which have been generated from each single source instruction can be concurrently displayed on the display device 14. An indication can also be given on the device 14 so as to inform the operator which blocks of the machine part instructions the machine tool is presently executing. Accordingly, reference to the machine tool motion, particularly to a present location of a tool used makes it possible to search where the part program includes an error which is supposed to cause an incorrect movement of the machine tool. Further, it is checked as to whether such an error has been involved in designating a point of a cutting statement or in defining coordinate values of a definition statement. The cutting statement or the definition statement including the error is searched for display on the display device 14, and data is input by means of the data input keys 15, so that the cutting statement or the definition statement can be revised.

Figure 33:
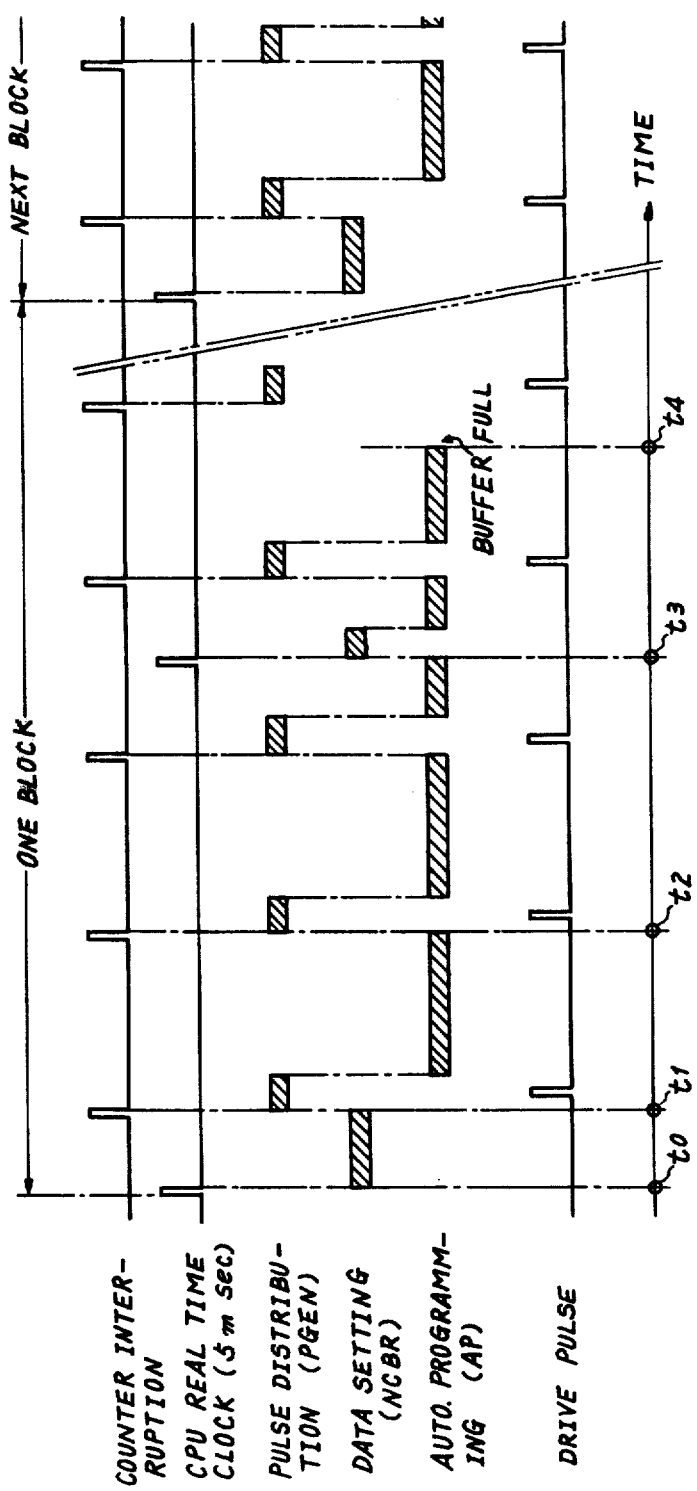
FIG. 33 is a time chart illustrative of operational allocation of the controller to the major processing routines in automatic operation mode.

The whole rough flow of the routines executed by the central processing unit 21 in the AUTOMATIC OPERATION mode will now be described with reference to FIGS. 32 and 33. The operation of that mode is initiated by depressing the start button after switching the mode selector 17 to the AUTOMATIC OPERATION mode. When one real time clock pulse is generated within the processing unit 21 at the time t0, the data setting routine NCBR is started, wherein one block of the machine part instruction data being stored in the buffer area B1 is read out therefrom in step (23) and then, the subroutine AXIS is executed so as to set control axis data, feed rate data, feed amount data and the like into the data table based upon the read-out block of the machine part instruction data. In step (30) of the data setting routine NCBR, the counter 41 is triggered to immediately output one interruption pulse.

The pulse distribution routine PGEN is initiated at the time t1 in response to the interruption pulse from the counter 41. Where positioning control is being instructed by the read-out block, the routine jumps to the subroutine POUT so as to distribute one drive pulse to a commanded control axis of the machine tool and returns to the routine PGEN. On the other hand, where contouring control is being instructed by the read-out block, a jump is effected from the routine PGEN to the subroutine LINE and further, to the subroutine POUT, whereby one drive pulse is distributed to a command control axis designated as a major axis. After return to the subroutine LINE, a jump is effected to the subroutine PCHK and further, to the subroutine POUT, whereby one drive pulse is distributed also to another control axis which has been instructed to be simultaneously controlled together with the major axis. Return is then effected from the subroutine POUT to the subroutine PCHK, to the subroutine LINE and finally, to the pulse distribution routine PGEN. Upon termination of the routine PGEN, the automatic programming routine AP is then executed.

In the automatic programming routine AP, a jump is effected to the subroutine AP01, AP02 or AP03 for defining a DA, a point, a line, a circle or a pattern. A jump is further effected to the subroutine AP10 for processing a cutting modifier word and then, to the subroutine AP11, AP12 or AP13 for processing a machining cycle designated by a label number. In step (6) of the automatic programming routine AP, a cycle table or machine part instruction data that has been prepared through the execution of one of the subroutines AP11 to AP13 is stored in the buffer area B1. Basically, the automatic programming routine AP is repeatedly executed until the buffer area B1 is filled with the machine part instruction data. However, since in the pulse distribution routine PGEN, a calculated generation period KT has been preset into the counter 41 prior to the distribution of the drive pulse to the machine tool, the interruption pulse may be generated from the counter 41 in the course of the execution of the automatic programming routine AP, for example, at the time t2. At such time, the programming routine AP is immediately halted and the data in process is temporarily stored in the random access memory 23. This interruption processing is executed in accordance with an interruption processing program, not shown, being stored in memory addresses 0 to n0 of the read-only memory 22. The pulse distribution routine PGEN is then executed as mentioned previously, whereby another drive pulse is distributed. Upon termination of the routine PGEN, the data which was temporarily stored at the time t2 is entered into the central processing unit 21, whose operational state is thus restored as it was at the time t2, so that the automatic programming routine AP is executed again from a process next to the halted process.

In this manner, the pulse distribution routine PGEN and the automatic programming routine AP are alternatively executed unless the interruption based upon the real time clock pulse is effected and unless the buffer area B1 becomes full with the machine part instruction data. However, in the course of the execution of the automatic programming routine AP, the real time clock pulse may be generated, for example, at the time t3. At such time, the programming routine AP is immediately halted and the data setting routine NCBR is executed through steps (10), (11) and (11-1) thereof, thus returning routine to the automatic programming routine AP.

When the buffer area B1 becomes full with the machine part instruction data, for example, at the time t4, the automatic programming routine AP is terminated. Further, each time the real time clock pulse is generated, the data setting routine NCBR is executed so as to check whether the pulse distribution and the auxiliary function have been completed or not. Upon completion of the pulse distribution and the auxiliary function, the data setting routine NCBR advances to step (22) through steps (10) to (15). As a result, the numerical control operation in accordance with the unit block of the machine part instruction data is terminated, and the next unit block of the machine part instruction data is read out, so that the numerical control operation in accordance therewith is again initiated.

During the execution of the pulse distribution routine PGEN, the execution of the data setting routine NCBR is inhibited in accordance with the aforementioned interruption processing program even when the real time clock pulse is generated. It is therefore noted that the pulse distribution routine PGEN is on a higher level of interruption than the data setting routine NCBR and that the executions of these routines PGEN and NCBR take priority over that of the automatic programming routine AP.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:
1. A numerical control system comprising:
   a machine tool having a plurality of feed servomechanisms for machining a workpiece;
   data reading means adapted to operate prior to control of said machine tool for reading a first record medium carrying source language instruction data prescribing movement of said machine tool and a second record medium carrying tool data for tools to be used in said machine tool, said source language instruction data being written in an automatic programming language; and a data processor connected to said data reading means and said machine tool and comprising:
(a) first and second data storage means connected to said data reading means for respectively storing said source language instruction data and said tool data read by said data reading means,
(b) third data storage means for storing a plurality of blocks of machine part instruction data,
(c) language translator means connected to said first, second and third data storage means for translating each block of said source language instruction data and related tool data of said tool data stored in said first and second data storage means, into a number of blocks of machine part instruction data and for storing the same in said third data storage means, and
(d) numerical control means connected to said third data storage means and said machine tool for reading out each block of said machine part instruction data from said third data storage means and for numerically controlling said feed servomechanisms of said machine tool in accordance with said read-out block of said machine part instruction data.

2. A numerical control system as set forth in claim 1, wherein:
a data display device is further provided connected to said data processor; and
said data processor further comprises data display control means connected between said third data storage means and said data display device for displaying on said data display device said machine part instruction data stored in said third data storage means.

3. A numerical control system as set forth in claim 1 or 2, wherein:
said language translator means is enabled to operate only when said numerical control means is out of operation.

4. A numerical control system as set forth in claim 2, further comprising:
interface circuit means connected to said numerical control means for applying an interruption signal to said numerical control means so as to instruct the same to operate.

5. A numerical control system as set forth in claim 4, wherein:
said interface circuit means is also connected to said machine tool and cooperates with said numerical control means for applying to said feed servomechanisms command signals derived from said each block of said machine part instruction data so as to numerically control movements of said machine tool, each of said command signals being indicative of the length and velocity that said machine tool is to move.

6. A numerical control system as set forth in claim 5, wherein:
said interface circuit means is adapted to receive frequency designation data from said numerical control means so as to supply thereto said interruption signal at a frequency corresponding to said frequency designation data,
whereby said numerical control means is enabled to produce said command signals of said frequency corresponding to said frequency designation data.

7. A numerical control system as set forth in claim 6, wherein said interface circuit means includes:
a clock pulse generator for generating clock pulses at a fixed frequency, and
a presettable counter connected to said pulse generator for receiving said clock pulses therefrom and presettable with a value indicative of a pulse generation period supplied as said frequency designation data from said numerical control means, said presettable counter generating said interruption signal each time it receives from said clock pulse generator said clock pulses of a number coinciding with said value indicative of said pulse generation period.

8. A numerical control system as set forth in any one of claims 1, 2, 4, 5, 6 or 7, wherein:
manual data input means is further provided for designating tool numbers of said tool data for which is to be stored in said second data storage means, prior to control of said machine tool;
said second record medium carries said tool data for said tools as well as other tool data for tools which are anticipated to be used also in said machine tool; and
said data processor further comprises:
data write-in means connected to said manual data input means and said second data storage means for storing in said second data storage means said tool numbers designated by said manual data input means prior to control of said machine tool, and
tool data storing control means connected to said data reading means and said second data storage means and operable prior to control of said machine tool for selecting said tool data for said tools whose tool numbers are stored in said second data storage means from all of said tool data read by said data reading means, so as to store said selected tool data in said second data storage means.

* * * * *